United States Patent
Ito et al.

[11] Patent Number: 5,969,048
[45] Date of Patent: Oct. 19, 1999

[54] COLORED COATING COMPOSITION

[75] Inventors: Etsuyuki Ito, Hirakata; Hideaki Tsujioka, Yawata; Tsuyoshi Terada, Kitakatsuragi-gun; Takayuki Fujita, Mino, all of Japan

[73] Assignee: Nippon Paint Co., Ltd., Osaka, Japan

[21] Appl. No.: 08/860,199

[22] PCT Filed: Dec. 26, 1995

[86] PCT No.: PCT/JP95/02687

§ 371 Date: Jul. 11, 1997

§ 102(e) Date: Jul. 11, 1997

[87] PCT Pub. No.: WO96/21703

PCT Pub. Date: Jul. 18, 1996

[30] Foreign Application Priority Data

Jan. 12, 1995 [JP] Japan ..................... 7-003269

[51] Int. Cl.$^6$ ..................... C08L 71/02
[52] U.S. Cl. ..................... 525/186; 525/190; 524/407; 524/418; 524/430; 524/435; 524/495
[58] Field of Search ..................... 525/186, 190; 524/406, 407, 413, 418, 420, 430, 431, 432, 435, 436, 495

[56] References Cited

U.S. PATENT DOCUMENTS 5,270,392  12/1993  Okude et al. ..................... 525/207
5,378,275   1/1995  Shiraga et al. ..................... 106/417

*Primary Examiner*—Edward J. Cain
*Attorney, Agent, or Firm*—Wenderoth, Lind & Ponack, L.L.P.

[57] ABSTRACT

A colored coating composition comprising (a) 5 to 60% by weight of a polymer having a carboxyl group and a carboxylate group; (b) 5 to 60% by weight of a polymer having a hydroxyl group and an epoxy group; (c) 0.05 to 20% by weight of a pigment-dispersing agent; and (d) 0.1 to 50% by weight of a pigment; (wherein, each amount formulated of the components (a) to (d) is based on the weight of total solid in the colored coating composition), wherein, an acid total amount AR and a base total amount BR which are derived from said pigment-dispersing agent, and an acid total amount AP and a base total amount BP which are derived from said pigment, suffice the following relations: AR>0.5 BP or BR>0.5 AP, and AR+AP >BR. Thus provided is a solid color coating composition that can meet the requirements of mar resistance, acid resistance, storage stability, and excellent appearance.

18 Claims, No Drawings

COLORED COATING COMPOSITION

FIELD OF THE INVENTION

The present invention relates to a colored coating composition which is suitable for an automotive top coating composition and a coil coating composition.

BACKGROUND OF THE INVENTION

A solid color coating composition containing an aminoplast as a curing agent has been conventionally widely known. However, in the case of a coating composition containing as a curing agent only an aminoplast, a crosslinked portion of a coated film has poor acid resistance, and the coated film is damaged by acid rain which has recently become a serious problem.

The present inventors have already suggested a curable resin composition comprising a polymer having a specific halfester group and a polymer having a hydroxyl group and an epoxy group, in Japanese Patent Laid-Open Publication No. Hei 3-287650. This composition is excellent in acid resistance and is not damaged by acid rain, since it uses an acid anhydride curing system. However, the coating system suggested by these inventors is basically designed to obtain a clear coating. Therefore, a solid color coating composition containing a pigment has not been investigated.

In the case of solid color, excellent appearance, high mar resistance and the like are required as well as the above-described acid resistance. Further, it is important that the coating composition is high solid. On the other hand, to obtain high mar resistance together with the acid resistance, it is indispensable to make a crosslinked coated film having high density. As a result, a problem occurs that stress strain is concentrated in the interface of a coated film in curing with thermosetting, and consequently adhesion to an undercoat becomes poor.

The present invention has been made to solve the above-described conventional problems, and the object thereof is to provide a solid color coating composition which suffices scratch resistance, acid resistance, storage stability and excellent appearance.

SUMMARY OF THE INVENTION

The present invention provides a colored coating composition comprising (a) 5 to 60% by weight of a polymer having a carboxyl group and a carboxylate group, which is obtained by reacting:
  (i) an acid anhydride group-containing polymer, obtained by copolymerizing
    (1) 15 to 40% by weight of an acid anhydride group-containing ethylenically unsaturated monomer, with
    (2) 60 to 85% by weight of the other copolymerizable ethylenically unsaturated monomer; with
  (ii) a hydroxyl group-containing compound having 1 to 12 carbon atoms; in an amount so that a molar ratio of the acid anhydride group to the hydroxyl group becomes 1/10 to 1/1;

(b) 5 to 60% by weight of a polymer having a hydroxyl group and an epoxy group, which is obtained by copolymerizing:
  (i) 5 to 70% by weight of a hydroxyl group-containing ethylenically unsaturated monomer represented by the formula:

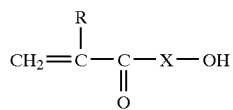

[wherein R is a hydrogen atom or a methyl group, and X is an organic chain represented by the formula:

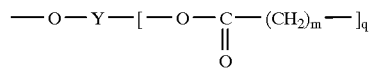

(wherein Y is a linear or branched alkylene group having 2 to 8 carbon atoms, m is an integer of 3 to 7 and q is an integer of 0 to 4) or an organic chain represented by the formula:

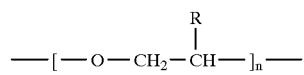

(wherein R is an hydrogen atom or a methyl group and n is an integer of 2 to 50)] and
  (ii) 10 to 60% by weight of an epoxy group-containing ethylenically unsaturated monomer, and optionally
  (iii) 0 to 85% by weight of the other copolymerizable ethylenically unsaturated monomer;

(c) 0.05 to 20% by weight of a pigment-dispersing agent; and (d) 0.1 to 50% by weight of a pigment; (wherein, each amount formulated of the components (a) to (d) is based on the weight of total solid in the colored coating composition), wherein, an acid total amount AR and a base total amount BR which are derived from said pigment-dispersing agent and an acid total amount AP and a base total amount BP which are derived from said pigment suffice, the following relations:

AR>0.5 BP or BR>0.5 AP, and

AR+AP>BR, and the above-described object is achieved by this invention.

DETAILED DESCRIPTION OF THE INVENTION

Dispersion stabilization of a pigment is an important subject in the art of coating production. It can be said that good pigment dispersing can be achieved by preventing re-flocculation after dispersing and by stabilizing the dispersion. In a conventional polyester/melamine-based coating composition or acryl/melamine-based coating composition for automobiles, dispersion stabilization of a pigment has been attained by adsorption of a resin utilized for dispersion to the pigment. When attention is paid to an acid/epoxy curing system such as for example the art of the instant application, however, a resin having an acid group carries too much absorbable functional groups, and causes bridging flocculation between the pigments. On the other hand, in a resin containing an epoxy group, functional groups which can be introduced are restricted, therefore, the number of functional groups which can generally achieve dispersion stability by adsorbing a pigment becomes small.

It is public known that dispersion stability of a pigment can be achieved by utilizing a pigment-dispersing agent. In the resin system as described above, if the dispersing agent is formulated according to a usual formulation, the reaction of the resin is promoted even at ambient temperature by acids and bases in the dispersing agent, stability of the resulting coating composition decreases, and the dispersion becomes insufficient.

As a result of the investigation, the present inventors have noticed the amount of acids and bases in the pigment and the amount of acids and bases in the dispersing agent, and found that excellent stability with the lapse of time of the coating composition, sufficient dispersion degree, and dispersion stability can be obtained if specific conditions are sufficed.

The polymer (a) having a carboxyl group and a carboxylate group used in the curable resin composition of the present invention can be obtained by reacting the acid anhydride group-containing polymer (a)(i) with the hydroxyl group-containing compound (a)(ii). This is a half-fester group-containing polymer having a molecular weight of 1000 to 8000, preferably of 1500 to 5000, and an acid value of 5 to 300 mgKOH/g, preferably of 50 to 250 mgKOH/g. When the acid values is less than 5 mgKOH/g, curability becomes deficient, and when over 300 mgKOH/g, storage stability becomes poor. When the molecular weight is too high, viscosity increases and appearance of the coated film becomes poor, and when the molecular weight is too low, curability becomes deficient.

The acid anhydride group-containing polymer (a)(i) is obtained by copolymerizing 15 to 40% by weight, preferably 15 to 30% by weight of the acid anhydride group-containing ethylenically unsaturated monomer (a)(i)(1) and 60 to 85% by weight, preferably 70 to 85% by weight of the other copolymerizable ethylenically unsaturated monomer (a)(i)(2). When the amount of the acid anhydride group-containing ethylenically unsaturated monomer (a)(i)(1) is less than 15% by weight, curability becomes deficient, and when over 40% by weight, the resulting coated film becomes hard and brittle, and weather resistance becomes poor. Examples of the acid anhydride group-containing ethylenically unsaturated monomer (a)(i)(1) include itaconic anhydride, maleic anhydride, citraconic anhydride and the like.

The other copolymerizable ethylenically unsaturated monomer (a)(i)(2) is not particularly restricted if it does not exert a harmful influence on the acid anhydride group, and preferably a monomer containing one ethylenically unsaturated bond having 3 to 15 carbon atoms, particularly 3 to 12 carbon atoms.

It is also possible to mix two or more ethylenically unsaturated monomers and to use the mixture as the other copolymerizable ethylenically unsaturated monomer (a)(i) (2). The reason for this is that such a mixture is effective to improve compatibility between the resins. Specific examples of the ethylenically unsaturated monomer which can be suitably used include styrene, α-methylstyrene, p-t-butylstyrene, (meth)acrylate (for example, methyl (meth) acrylate, ethyl (meth)acrylate, propyl (meth)acrylate, n, i and t-butyl (meth)acrylate, 2-ethylhexyl (meth)acrylate, lauryl (meth)acrylate, cyclohexyl (meth)acrylate, isoboronyl (meth)acrylate and the like), VeoVa-9 and VeoVa-10 manufactured by Shell Co., and the like. When styrene or a styrene derivative is used as the other copolymerizable monomer, it is preferred to used them in an amount of 5 to 40% by weight. When the amount is 40% by weight or more, weather resistance becomes poor.

There can be also used a monomer having a carboxyl group such as acrylic acid and methacrylic acid. Particularly, when a long-chain carboxylic acid monomer having a spacer moiety of about 5 to 20 carbon atoms between an ethylenically unsaturated group and a carboxyl group is used, mar resistance of the coated film increases, and it is particularly preferable for a dark color coating composition, for example, for red, black, green, blue coating compositions and the like.

For example, a carboxyl group-containing ethylenically unsaturated monomer obtained by subjecting a hydroxyl group containing ethylenically unsaturated monomer and an acid anhydride group-containing compound to the half esterification reaction in an amount that a molar ratio of a hydroxyl group to an acid anhydride group becomes 1/0.5 to 1/1.0, preferably 1/0.8 to 1/1.0, can be used as the other copolymerizable ethylenically unsaturated monomer (a)(i) (2). When the molar ratio is equal to or more than 1/0.5, viscosity of the polymer becomes high, which results in poor handling ability. On the other hand, when the molar ratio is equal to or less than 1/1.0, storage stability of the coating composition deteriorates.

The hydroxyl group-containing ethylenically unsaturated monomer to be used herein preferably has 6 to 23 carbon atoms, more preferably 6 to 13 carbon atoms. When the carbon chain of the monomer is too short, flexibility around the crosslinking point becomes poor, and the resulting coated film becomes too hard. On the other hand, when the carbon chain is too long, the molecular weight between the crosslinking points becomes too large. The hydroxyl group-containing ethylenically unsaturated monomer (b)(i) is specifically included, which is described below as a monomer used for preparation of the polymer having a hydroxyl group and an epoxy group (b).

The acid anhydride group-containing compound used herein is not particularly restricted if it is half-esterified by a hydroxyl group to provide a carboxy functional group in an ambient reaction condition such as room temperature to 150° C. under normal pressure. It is preferable to use an acid anhydride group-containing compound having a cyclic (unsaturated or saturated) group having 8 to 12, particularly 8 to 10 carbon atoms. The reason for this is that such a compound improves compatibility of the resulted resin. Examples of the preferred acid anhydride include hexahydrophthalic anhydride, phthalic anhydride, 4-methylhexahydrophthalic anhydride, tetrahydrophthalic anhydride, trimellitic anhydride and the like.

The half esterification reaction between the hydroxyl group-containing ethylenically unsaturated monomer and acid anhydride group-containing compound is carried out at a temperature of room temperature to 150° C. according to a method known to the art.

The copolymerization between the acid anhydride group-containing ethylenically unsaturated monomer (a)(i)(1) and ethylenically unsaturated monomer (a)(i)(2) is carried out by a known method such as solution polymerization (for example, radical polymerization and the like). For example, it can be carried out at a polymerization temperature of 100 to 150° C. for a polymerization time of 3 to 8 hours. As an initiator, there can be suitably used an azo or peroxide initiator. Other additives such as a chain transfer agent and the like can also be used. It is preferred that the number-average molecular weight of the resulting polymer is preferably from 1000 to 8000, particularly from 1500 to 5000. When the number-average molecular weight exceeds 8000, compatibility between the resins becomes poor, which results in poor appearance of the coated film. On the other hand, when the number-average molecular weight is smaller than 1000, curability of the curable resin composition becomes insufficient. The resulting polymer has at least two acid anhydride groups, preferably 2 to 15 acid anhydride groups, per molecule on an average. When the number of the acid anhydride groups per molecule is smaller than 2, curability of the curable resin composition becomes insufficient. On the other hand, when it exceeds 15, the resulting coated film becomes too hard and brittle, which results in poor weather resistance.

Then, the resulting acid anhydride group-containing polymer (a)(i) is reacted with a hydroxyl group-containing compound (a)(ii) in a proportion so that a molar ratio of an acid anhydride group to a hydroxyl group becomes 1/10 to 1/1, preferably 1/5 to 1/2 to prepare a polymer having a carboxyl group and a carboxylate group (a). When the molar ratio is smaller than 1/10, an amount of the excessive alcohol is too large, which causes pinholes at the step of curing. On the other hand, when the molar ratio exceeds 1/1, the unreacted anhydride group remains in the resulting resin composition, and storage stability becomes poor.

The hydroxyl group-containing compound (a)(ii) which can be used in the present invention is mono alcohol having 1 to 12 carbon atoms, preferably 1 to 8 carbon atoms. The reason for this is that such a monoalcohol evaporates when heating, and is convenient for regenerating an acid anhydride group. Examples of the hydroxyl group-containing compound which can be suitably used include methanol, ethanol, n-propanol, i-propanol, n-butanol, i-butanol, t-butanol, methylcellosolve, ethylcellosolve, dimethylaminoethanol, diethylaminoethanol, acetol, allyl alcohol, propargyl alcohol, furfury alcohol and the like. Particularly preferred examples include acetol, allyl alcohol, propargyl alcohol, furfuryl alcohol and methanol. The polymer having a carboxyl group and a carboxylate group (a) has an acid value of 30 to 250 mgKOH/g, preferably 50 to 200 mgKOH/g, and more preferably 70 to 180 mgKOH/g. When the acid value is over the upper limit, water resistance decreases, and then below the lower limit, curability decreases.

The polymer (a) component can be contained in the colored coating composition in an amount of 5 to 60% by weight, preferably 10 to 50% by weight, more preferably 10 to 40% by weight based on the weight of the total solid in the colored coating composition. When the amount of the polymer (a) is less than 5% by weight, acid resistance of the resulting coated film decreases. On the other hand, when it exceeds 60% by weight, the coated film becomes too hard.

The polymer having a hydroxyl group and an epoxy group (b) used in the resin composition of the preset invention includes preferably 2 to 10, more preferably 3 to 8 epoxy groups per molecule on an average, and preferably 2 to 12, more preferably 4 to 10 hydroxyl groups per molecule on an average. The epoxy equivalent is preferably from 100 to 800, more preferably from 200 to 600, and the hydroxyl equivalent is preferably from 200 to 1200, more preferably from 400 to 1000. When the epoxy equivalent is over the above described upper limit, curability of the curable resin composition becomes insufficient. On the other hand, when below the lower limit, the resin becomes too hard and the resulting coated film becomes too brittle. When the hydroxyl equivalent is less than 200, water resistance of the cured coated film is not sufficient, and when over 1200, curability is not sufficient. The number-average molecular weight is generally from 500 to 8000, preferably from 700 to 7000, and more preferably from 1000 to 6000. When the number-average molecular weight is over 8000, viscosity rises too much, and appearance of the coated film becomes poor. On the other hand, when the number-average molecular weight is below 500, curability decreases.

This polymer (b) can be obtained by copolymerizing 5 to 70% by weight, preferably 15 to 50% by weight of a hydroxyl group-containing ethylenically unsaturated monomer (b)(i) represented by the formula:

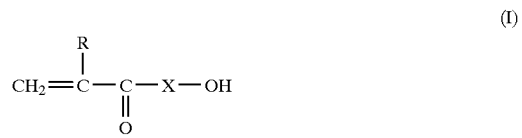

[wherein R is a hydrogen atom or a methyl group, and X is an organic chain represented by the formula:

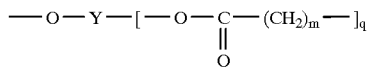

(wherein Y is a linear or branched alkylene group having 2 to 8 carbon atoms, m is an integer of 3 to 7 and q is an integer of 0 to 4) or an organic chain represented by the formula:

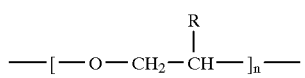

(wherein R is an hydrogen atom or a methyl group and n is an integer of 2 to 50)], 10 to 60% by weight, preferably 15 to 50% by weight of an epoxy group-containing ethylenically unsaturated monomer (b)(ii), and optionally 0 to 85% by weight, preferably 10 to 60% by weight of the other copolymerizable ethylenically unsaturated monomer (b)(iii). When the amount of the hydroxyl group-containing ethylenically unsaturated monomer is not more than 5% by weight, curability becomes deficient. On the other hand, when not less than 70% by weight, reaction does not sufficiently proceed since compatibility thereof becomes deficient. When the amount of the epoxy group-containing ethylenically unsaturated monomer is not more than 10% by weight, curability becomes deficient. On the other hand, when not less than 60% by weight, the resin becomes too hard resulting in weather resistance deficiency.

With respect to a side chain having hydroxyl group of the hydroxyl group-containing ethylenically unsaturated monomer (b)(i) which can be used for preparation of the polymer having a hydroxyl group and an epoxy group (b), when it is too short, flexibility around a crosslinking point becomes poor and the resulting coated film becomes too hard. On the other hand, when it is too long, a molecular weight between crosslinking points becomes too large. Therefore, the carbon number is preferably from 2 to 20, more preferably from 4 to 10. Specific examples include 2-hydroxybutyl (meth) acrylate, 4-hydroxybutyl (meth)acrylate, 6-hydroxyhexyl (meth)acrylate, 2-hydroxyethyl (meth)acrylate, 2-hydroxypropyl (meth)acrylate, and reaction products of these with ε-caprolactone.

These compounds are commercially available, and examples thereof include 4-hydroxybutyl acrylate "4HBA" and 4-hydroxybutyl methacrylate "4HMBA" (manufactured by Mitsubishi Kasei Corporation), "Placcel FM1" and "Placcel FA12" (manufactured by Daicel Chemical Industries, Ltd.), and the like. These compounds can be obtained by esterification of (meth)acrylic acid with large excess amount of diol (for example, 1,4-butane diol, 1,6-hexane diol, polyethylene glycol, polypropylene glycol). Examples of a propylene oxide monomer include "Blemmer PP-1000" and "Blemmer PP-800", examples of an ethylene oxide monomer include "Blemmer PE-90", manufactured by Nippon Yushi Co., Ltd.

As the monomer (b)(ii), for example, glycidyl (meth) acrylate, 3,4-epoxycyclohexylmethyl (meth)acrylate and the like are included. As the other monomer (b)(iii), there are included the monomers described above as "the other copolymerizable ethylenically unsaturated monomer (a)(i)(2)" for preparing the acid anhydride group-containing polymer (a)(i).

The copolymerization is conducted by a known method such as a solution polymerization (for example, radical polymerization and the like), and for example can be conducted at a polymerization temperature of 100 to 150° C. for a polymerization time of 3 to 8 hours. As the initiator, peroxide-based and azo-based initiators can be suitably used. It is preferable to use the radical polymerization initiator in an amount of 3 to 15% by weight based on the total weight of monomers. A chain transfer agent and the like may be added as the other additive to the above-described monomer composition.

The polymer (b) component can be formulated in an amount of 5 to 60% by weight, preferably 10 to 50% by weight, more preferably 10 to 40% by weight based on the weight of the total solid in the colored coating composition. When the amount of the polymer component (b) is below 5% by weight, curability of the coated film decreases. On the other hand, when over 60% by weight, yellowing resistance becomes poor.

The pigment-dispersing agent (c) used in the present invention varies depending on the kind of a pigment used in the colored coating composition, and is not particularly restricted if it is a surfactant known to the those skilled in the art. Example of the pigment-dispersing agent include a polyesterpolyamide which is a reaction product of a poly (lower alkylene) imine and a polyester as described in Japanese Patent Laid-Open Publication No. Sho 54-37082, and a polyolpolyisocyanate which is a reaction product of a polyisocyanate, hydroxy compound and the like as described in Japanese Patent Laid-Open Publication No. Sho 63-241018. Preferable examples include polyurethane-based, polyurea-based, polyester-based and acryl-based resins.

These are commercially available, and examples thereof include "Diepsrbic" series manufactured by Bic Chemie Corp., "Solspers" series manufactured by Zeneka Corp., "EFKA-40" series and "EFKA-400" series manufactured by EFKA Corp., and the like.

The pigment (d) used in the present invention varies depending on the kind of a pigment-dispersing agent used in the colored coating composition, and is not particularly restricted if it is known to those skilled in the art. These pigment components can be used in combination.

Examples of color pigments which can be suitably used as the pigment in the present invention include titanium dioxide, lead white, graphite, zinc sulfide, zinc oxide, chromium oxide, zinc chromate, strontium chromate, barium chromate, nickel titanium yellow, chromium titanium yellow, graphite, carbon black, iron oxide, iron oxide yellow, iron oxide red, iron oxide black, phthalocyanine blue, phthalocyanine green, ultramarine blue, quinacridone, indanethrone, isoindolinone, anthraquinone, dioxadine violet, perylene, anthrapyrimidine, benzimidazolone, cadmium sulfide, diketopyrropyrrole and the like.

Examples of the extender pigment which can be used in the present invention include inorganic compounds derived from calcium carbonate, magnesium carbonate, barium sulfate, silicic acid, silicate, aluminium hydrate, calcium sulfate and the like.

Examples of the lusterous pigments which can be used in the present invention include metal flake pigments selected from a mica pigment, aluminium flake, bronze flake, tin flake, gold flake, silver flake, copper flake, titanium metal flake, stainless steel flake, nickel flake, chromium, cobalt sulfide, manganese sulfide, titanium sulfide, alloy flakes of the above-mentioned metal, metal flake coated with a plastics, phthalocyanine blue flake, and the like.

In the colored coating composition of the present invention, it is preferable to select and formulate a pigment-dispersing agent and a pigment so that an acid total amount $AR$ and a base total amount $BR$ which are derived from the pigment-dispersing agent, and an acid total amount $AP$ and a base total amount $BP$ which are derived from said pigment, suffice the following relations:

$$AR > 0.5\ BP\ \text{or}\ BR > 0.5\ AP,$$

and $$AR + AP > BR,$$

in order to enhance dispersibility of the pigment. Herein, the pigment-dispersing agent and the pigment respectively can be used in combination of two or more.

The phrase "an acid total amount and a base total amount which are derived from the pigment-dispersing agent" means the amount of acids or bases of the pigment-dispersing agent existing in the colored coating composition. For example, "an acid total amount and a base total amount which are derived from the pigment-dispersing agent" can be determined by measuring the amount of acids or bases existing in the pigment-dispersing agent of unit amount by the potentiometric titration method, and by multiplying the resulted value by the amount formulated of the pigment-dispersing agent. The measurement can be conducted specifically as described in T. Kobayashi, K. Tsutsui and S. Ikeda, coloring material, 61, No. 12, p693.

The amount of acids is determined by diluting 1 g of a pigment-dispersing agent with 100 ml of a 4:1 mixed solution of MIBK and methanol, conducting titration with a $10^{-2}N$ potassium methoxide solution, and measuring the amount of the potassium methoxide solution required for the neutralization. The amount of bases is determined by diluting 1 g of a pigment-dispersing agent with 100 ml of MIBK, conducting titration with a MIBK solution of $10^{-2}N$ perchloric acid, and measuring the amount of the perchloric acid solution required for the neutralization.

The phrase "an acid total amount and a base total amount which are derived from the pigment" means the amount of acids or bases of the pigment existing in the colored coating composition. For example, "an acid total amount and a base total amount which are derived from the pigment" can be determined by measuring the amount of acids or bases existing on the surface of the pigment of unit amount by a back titration method using respectively several kinds of bases and acids having different strength, and by multiplying the resulted value by the amount formulated of the pigment. The measurement can be conducted specifically as described in T. Kobayashi and S. Ikeda, report of The Chemical Society of Japan, 1993, pp 145 to 146.

The amount of acids is determined as follows. First, 2 g of a pigment and 30 ml of a $10^{-2}M$ methylisobutylketone (MIBK) solution of triethylamine (TEA) as a base are charged in a Erlenmeyer flask and sealed, then the content is dispersed by ultrasonic wave for 1 hour in a ultrasonic wave washing apparatus in which an thermostatic bath is controlled at 20° C. 10 ml of a supernatant obtained by centrifugal separation of pigments from this dispersed solution is diluted with 100 ml of MIBK, and titrated (back-titrated) with $10^{-2}$M perchloric acid solution. The amount of acids is determined by the amount of TEA consumed by acids on the surface of a titanium oxide pigment.

The amount of bases is determined by, first, charging 2 g of a pigment and 30 ml of a MIBK solution of $10^{-2}$M acetic acid as an acid into a Erlenmeyer flask, then conducting the same procedure as described, and conducting titration with $10^{-2}$M potassium methoxide solution.

In general, the pigment-dispersing agent (c) component can be formulated in an amount from 0.05 to 20% by weight, preferably from 0.1 to 10% by weight, more preferably from 0.5 to 5% by weight based on the weight of the total solid in the colored coating composition. When the amount of the pigment-dispersing agent (c) is below 0.05% by weight, pigment-dispersibility of the resulting coating composition lowers. On the other hand, when the amount is over 20% by weight, adhesiveness and weather resistance of the resulting coating composition deteriorate.

In general, the pigment (d) component can be formulated in an amount from 0.1 to 50% by weight, preferably from 1 to 47% by weight, more preferably from 2 to 45% by weight based on the weight of the total solid in the colored coating composition. When the amount of the pigment (d) component is below 1% by weight, covering property becomes poor. On the other hand, when the amount is over 50% by weight, weather resistance deteriorates.

The pigment usually forms a pigment paste with a pigment-dispersing resin, and formulated in the resulting coating composition. The formation of the pigment paste is conducted by a method known to those skilled in the art, for example, using a ball mill or sand mill.

A binder component such as a polyester, aminoplast and silicone polymer can be optionally formulated in the colored coating composition of the present invention in addition to the above-described essential components. The reason for this it that a polyester is effective for improving adhesiveness of the resulting coated film, an aminoplast is effective for improving curability of the resulting coated film, and a silicone polymer is effective for increasing solid content and improving curability of the resulting coated film.

The polyester which can be used in the present invention is produced by the condensation reaction of usual acid (including an acid anhydride) with alcohol (polyhydric alcohol). Examples of the acid which can be used include dibasic acids such as phthalic acid, isophthalic acid, terephthalic acid, succinic acid, adipic acid, azelaic acid, sebacic acid, tetrahydrophthalic acid, hexahydrophthalic acid, maleic acid, fumaric acid and the like, acid anhydrides such as succinic anhydride, phthalic anhydride, tetrahydrophthalic anhydride, hexahydrophthalic anhydride, hymic anhydride, trimellitic anhydride, methylcyclohexenetricarboxylic anhydride, pyromellitic anhydride, and the like.

Examples of the polyhydric alcohol which can be used include ethylene glycol, propylene glycol, 1,3-butylene glycol, 1,6-hexane diol, diethylene glycol, dipropylene glycol, neopentyl glycol, triethylene glycol, hydrogenated bisphenol A, phenoldihydroxypropyl ether, glycerin, trimethylolethane, trimethylolpropane, pentaerythritol, dipentaerythritol and the like.

The polyester is synthesized by a usual esterification reaction. That is, a high molecular weight polyester is obtained by a dehydration condensation reaction of polyhydric alcohol and polybasic acid, or esterification by polyhydric alcohol and acid anhydride and further dehydration with an alkyl component. The formed ester preferably has an acid value of 5 to 300 mgKOH/g (solid), a hydroxyl value of 5 to 300 mgKOH/g (solid) and a number average molecular weight of 400 to 6000.

The polyester component can be formulated in an amount of up to 60% by weight, preferably 15 to 50% by weight, more preferably 15 to 30% by weight based on the weight of the total solid in the colored coating composition. When the amount of the polyester component is over 60% by weight, curability and acid resistance of the resulting coated film deteriorate.

The aminoplast used in the present invention is not particularly restricted if it is an amino resin usually used by those skilled in the art. Specific examples thereof include compounds obtained by modifying formaldehyde adducts of amine compounds with alcohol, such as melamine, benzoguanamine, urea and the like. The particularly preferable aminoplast is an alcohol-modified melamine-aldehyde adduct.

The aminoplast component can be formulated in an amount of up to 40% by weight, preferably 3 to 25% by weight, more preferably 5 to 10% by weight based on the weight of the total solid in the colored coating composition. When the amount of the aminoplast component is over 40% by weight, acid resistance of the resulting coated film deteriorates.

In the present invention, a silicone polymer can be used to further increase solid content. The silicone polymer which can be used in the present invention is, for example, a silicone polymer having an epoxy group and/or an alkoxy group, which is represented by the formula:

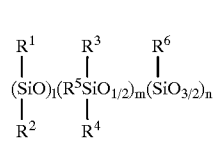

(II)

[wherein $R^1$ to $R^6$ independently represents a substituent selected from the group consisting of an alkyl group having 1 to 10 carbon atoms, a phenyl group having 1 to 10 carbon atoms, a phenethyl group having 1 to 10 carbon atoms, an alkoxy group having 1 to 5 carbon atoms and the group represented by the formula:

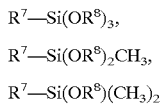

and

(wherein $R^7$ represents a linear or branched alkylene group or a linear or branched alkylene group having an ether or ester linkage, $R^8$ represents an alkyl group having 1 to 5 carbon atoms, and Y represents an aliphatic or alicyclic group having an epoxy group), provided that at least one of $R^1$ to $R^6$ is an alkoxy group and another at least one is epoxy group; l represents an integer of 1 to 20; m represents an integer of 0 to 4; and n represents an integer of 0 to 2]. A sequence of each repeating unit constituting this silicone polymer may be arranged at random, and is not limited to the order of the formula (II).

Examples of the silicone polymer having an epoxy group include "NUC silicone" series manufactured by Nippon Unicar Co., Ltd. Examples of the silicone polymer having an alkoxy group include "KC89-S" manufactured by Shin-etsu Chemical Co., Ltd. Examples of the silicone polymer having an epoxy group and an alkoxy group include "MKC silicate MSEP 2" series manufactured by Mitsubishi Kasei Corporation and "NUC silicone" series manufactured by Nippon Unicar Co., Ltd.

A method for producing the silicone polymer is described in "The 1990 Organic Silicone Material Chemical symposium, preliminary manuscript, pages 29 to 30". An epoxy group may be pendent from an aliphatic or alicyclic hydrocarbon chain or it may be present at terminal end thereof. In the silicone polymer (II), the aliphatic or alicyclic hydrocarbon chain having an epoxy group Y is represented, for example, by the following formula:

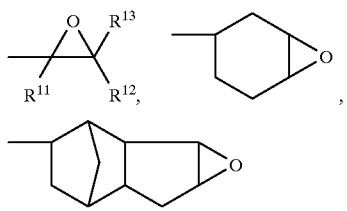

(wherein $R^{11}$, $R^{12}$ and $R^{13}$ represent a hydrocarbon having up to 4 carbon atoms).

In the present specification, the term "epoxy equivalent" means a weight in grams of a compound having 1 gram equivalent of an epoxy group. The term "alkoxy equivalent" means a weight in grams of a compound having 1 gram equivalent of an alkoxy group. The term "hydroxyl equivalent" means a weight in grams of a compound having 1 gram equivalent of a hydroxyl group.

The epoxy equivalent of this silicone polymer is 100 to 1500, and the alkoxy equivalent is 50 to 1500. When the epoxy equivalent is less than 100, storage stability of the resin composition becomes poor. On the other hand, when it exceeds 1500, curability becomes poor. A preferable range of the epoxy equivalent is 140 to 1000, more preferably 180 to 700. A preferably range of the alkoxy equivalent is 60 to 800, more preferably 80 to 500.

The silicone polymer component having an epoxy group and an alkoxy group can be formulated in an amount of not more than 30% by weight, preferably 3 to 20% by weight, more preferably 5 to 15% by weight based on the weight of the total solid contained in the colored coating composition. When an amount of the silicone polymer component exceeds 30% by weight, storage stability of the resulting resin composition becomes poor.

In the present invention, a silicone polymer having a hydroxyl group and a carboxyl group can be used together with or in place of the silicone polymer component having an epoxy group and/or an alkoxy group. The silicone polymer having a hydroxyl group and a carboxy group is obtained by subjecting a silicone polymer having a hydroxyl group and an acid anhydride group-containing compound to the half esterification reaction.

A number-average molecular weight of this silicone polymer is 500 to 6000, preferably 1000 to 4500. A hydroxyl value is 2 to 120, preferably 10 to 80. An acid value is 20 to 180, preferably 35 to 150. When the number-average molecular weight, hydroxyl value or acid value exceeds the upper limit of the above range, it becomes difficult to prepare a resin composition having satisfactory high solid content. On the other hand, when it is smaller than the lower limit, curability of the resulting resin composition becomes poor.

A silicone polymer having a hydroxyl group is commercially available, and examples thereof include KR-2001 manufactured by The Shin-etsu Chemical Co., Ltd, NUC-silicone series manufactured by Nippon Unicar Co., Ltd., represented by the following formula:

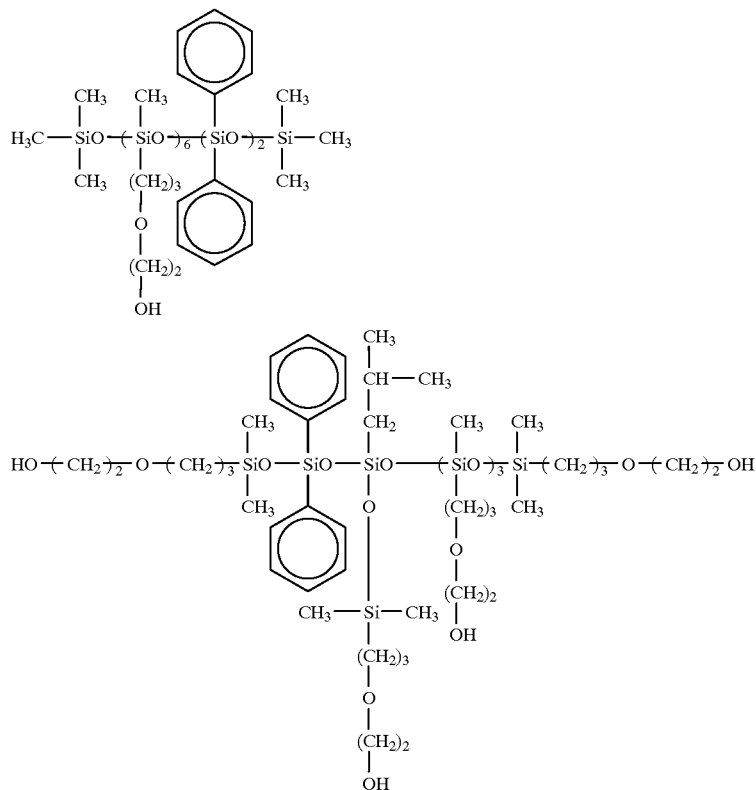

It is preferred that a silicone polymer having a hydroxyl group has 3 to 12 hydroxyl groups per molecule on an average. When the number of hydroxyl groups is less than 3, curability becomes poor. On the other hand, when it exceeds 12, viscosity becomes high and it becomes difficult to increase a non-volatile content of the resulting resin composition.

The acid anhydride group-containing compound is half-esterified by a hydroxyl group to provide a carboxy functional group, in an ambient reaction condition such as room temperature to 120° C. under normal pressure. It is preferred to used an acid anhydride group-containing compound having 8 to 12 carbon atoms, which has a unsaturated or saturated cyclic group. Such a component may improves compatibility of the resulting resin.

Examples of the preferred acid anhydride group-containing compound include hexahydrophthalic anhydride, phthalic anhydride, 4-metyl hexahydrophthalic anhydride, tetrahydrophthalic anhydride, trimellitic anhydride, and the like.

The half esterification reaction between the hydroxyl group-containing silicone polymer and the acid anhydride group-containing compound is carried out at a temperature of room temperature to 120° C. for 30 minutes to 8 hours according to a conventional procedure. When the reaction is carried out for a long period of time at a temperature of more than 120° C., a polyesterification reaction occurs and a high-molecular weight silicone polyester may be formed. Since such a high-molecular weight silicone polyester has small amount of functional groups and has high viscosity, it is not preferred to use in the present invention.

A silicone polymer component having a hydroxyl group and a carboxyl group can be formulated in an amount of not more than 30% by weight, preferably 3 to 20% by weight, more preferably 5 to 15% by weight based on the weight of the total solid contained in colored coating composition. When an amount of the silicone polymer component exceeds 30% by weight, storage stability of the resulting resin composition becomes poor.

When the silicone polymer component having an epoxy group and an alkoxy group and a silicone polymer component having a hydroxyl group and a carboxyl group is used in combination, they can be formulated in an amount that the sum of them is not more than 30% by weight, preferably 3 to 20% by weight, more preferably 5 to 15% by weight based on the weight of the total solid contained in colored coating composition. When the amount of the silicone polymer components exceeds 30% by weight, storage stability of the resulting coating becomes poor.

In addition to the above-described components, a curable resin composition of the present invention may contain a curing catalyst which is generally used for the esterification reaction between an acid and an epoxy, such as quaternary ammonium salts. Examples of the other catalyst which can be used for a curable resin composition of the present invention include benzyltrietylammonium chloride or bromide, tetrabutylammonium chloride, bromide, salicylate, glycolate or paratoluenesulfonate, and the like. These curing catalysts may be used in combination thereof.

A curing catalyst is generally used based on the solid component of the resin composition in an amount of 0.01 to 3.0 by weight, preferably 0.1 to 1.5% by weight, more preferably 0.4 to 1.2% by weight. When an amount of the curing catalyst is smaller than 0.01% by weight, curability becomes poor. On the other hand, when it exceeds 3.0% by weight, storage stability becomes poor.

In addition, a thin compound may be used in combination with these catalysts, as is described in Japanese Laid-Open Patent Publication No. Hei 2-151651 and No. Hei 2-279713. Examples of the tin catalyst include dimethyltin bis-(methyl maleate), dimethyltin bis-(ethyl maleate), dimethyltin bis-(butyl maleate), dibutyltin bis-(butyl maleate), and the like.

The tin compound can be generally used based on the solid component of the resin composition in an amount of 0.2 to 6.0% by weight, preferably 0.3 to 4.0% by weight, more preferably 0.4 to 3.0% by weight. When an amount of the tin compound is smaller than 0.2% by weight, storage stability becomes poor. On the other hand, when it exceeds 6.0% by weight, weather resistance becomes poor. When the curing catalyst and the tin compound is used in combination, it is preferred that the weight ratio of the curing catalyst to the tin compound is 1/4 to 1/0.2.

In order to increase crosslinking density and to improve water resistance, a blocked isocyanate may be added to a resin composition of the present invention. In order to improve weather resistance of the coated film, an ultraviolet absorber, a hindered amine photostabilizer and an antioxidant may be added. Crosslinked resin particles for controlling rheology, and a surface modifier for modifying appearance of the coated film may also be added. Furthermore, in order to control viscosity, alcoholic solvents (for example, methanol, ethanol, propanol, butanol, and the like) and hydrocarbon and ester solvents may be used as diluting agent.

When the crosslinked resin particles are used, they are added in an amount of 0.01 to 10 parts by weight, preferably 0.1 to 5 parts by weight, based on 100 parts by weight of the resin solid of the curable resin composition of the present invention. When an amount of the crosslinked resin particles exceeds 10 parts by weight, appearance of the coated film becomes poor. On the other hand, when it is smaller than 0.01 part by weight, no rheology controlling effect is obtained.

A resin to be used in the present invention has an acid group as a functional group. Accordingly, it is also possible to prepare and aqueous resin composition comprising water as a medium by neutralizing the acid group with amine.

A method for preparing the coating composition of the present invention is not specifically limited, and there can be used all methods which are known to those skilled in the art.

A coating composition of the present invention can be coated by spray coating, brush coating, dip coating, roll coating, curtain coating and the like. A substrate may be optionally undercoated or intercoated. A known coating composition can be used for undercoating or intercoating the substrate.

A coating composition of the present invention can be advantageously used for any substrate such as wood, metal, glass, fabric, plastic, foam and the like, particularly plastic and surface of metal such as steel, aluminium and alloys thereof. Generally, thickness of the coated film varies depending on the desired application. A film thickness of 0.5 to 3 mills is useful in almost all cases.

After applying the coating composition on the substrate, the resulting coating is cured. High crosslinking density is formed by curing at 100 to 180° C., preferably 120 to 160° C. A curing time varies depending on a curing temperature used, but is usually for 10 to 30 minutes at 120 to 160° C.

EXAMPLES

The following Examples further illustrate the present invention in detail but are not to be construed to limit the scope thereof. In the Examples, "parts" are by weight unless otherwise stated.

Preparation Example 1

Preparation of polymer having a carboxyl group and a carboxylate group (a)-1

65 parts of xylene was charged in a reaction vessel equipped with a thermometer, stirrer, cooling tube, nitrogen introducing tube and dropping funnel, and heated to 120° C. To this were added dropwise 30 parts by styrene, 21 parts of isobutyl acrylate, 23 parts of cyclohexyl methacrylate, 24 parts of maleic anhydride, 30 parts of propylene glycol monomethyl ether acetate and 10 parts of t-butyl peroxy 2-ethylhexanoate using the dropping funnel over 3 hours, and the mixture was further stirred for 2 hours to obtain a varnish having a non-volatile content of 53%, which comprises a polymer having an acid anhydride group (a)(i)-1 which has a number-average molecular weight of 2500.

To 175 parts of the resulted polymer (a)(i)-1 were added 1.4 parts of triethylamine and 8.6 parts of methanol, and the mixture was reacted for 2 hours at 40° C. to obtain a polymer having a carboxyl group and a carboxylate group (a)-1. Infrared absorption spectrum of the polymer (a)-1 was measured to recognize that absorption of the acid anhydride group (1785 cm$^{-1}$) was lost. The acid value of the resulting polymer (a)-1 was 137 mgKOH/g.

Preparation Example 2

Preparation of polymer having a carboxyl group and a carboxylate group (a)-2

The polymer having an acid anhydride group (a)(i)-2 was obtained according to the same manner as in Preparation Example 1 except that the composition shown in Table 1 was used. The resulted polymer had a non-volatile content of 65% and a number-average molecular weight of 1900.

TABLE 1

| Composition | parts |
| --- | --- |
| Xylene | 118 |
| Styrene | 30 |
| Isobutyl acrylate | 21 |
| Cyclohexyl methacrylate | 23 |
| Maleic anhydride | 24 |
| Propylene glycol monomethyl ether acetate | 30 |
| t-butyl peroxy 2-ethylhexanoate | 17 |

Then, the resulting polymer (a)(i)-2 was reacted with methanol according to the same manner as in Preparation Example 1 in the presence of triethylamine to obtain a polymer having a carboxyl group and a carboxylate group (a)-2. The resulted polymer (a)-2 had an acid value of 137 mgKOH/g.

Preparation Example 3

Preparation of polymer having a carboxyl group and a carboxylate group (a)-3

330 parts of Arcosorb PMA (manufactured by Kyowa Yuka K.K.), 800 parts of Placcel FM-1 (ε-caprolactone ring-opened adduct of 2-hydroxyethyl methacrylate (manufactured by Daicel Chemical Industries, Ltd.)), 540 parts of hexahydrophthalic anhydride and 0.48 parts of hydroquinonemonomethyl ether were charged in a 2 L reaction vessel equipped with a thermometer, stirrer, cooling tube, nitrogen introducing tube and dropping funnel, heated to 145° C. and kept at this temperature for 20 minutes. Then, the mixture was cooled to obtain a solution of an ethylenically unsaturated monomer containing a carboxyl group.

Then, 110 parts of xylene was charged in a 2 L reaction vessel equipped with a thermometer, stirrer, cooling tube, nitrogen introducing tube and dropping funnel, and heated to 130° C. To this were added dropwise monomers composed of 250 parts of styrene, 50 parts of cyclohexyl methacrylate, 180 parts of isobutyl acrylate, 250 parts of the solution of an ethylenically unsaturated monomer containing a carboxyl group obtained above, 250 parts of maleic anhydride, 350 parts of propylene glycol monomethyl ether acetate and 150 parts of t-butyl peroxy 2-ethylhexyl hexanoate, and an initiator solution over 3 hours. The solution was stirred for further 2 hours to obtain the polymer having an acid anhydride group (a)(i)-3 having a non-volatile content of 58% and a number-average molecular weight of 1500.

Then, 193 parts of the resulting polymer (a)(i)-3 and 12 parts of methanol were charged in a reaction vessel equipped with a thermometer, stirrer, cooling tube, nitrogen introducing tube and dropping funnel, heated to 60° C. and stirred for 36 hours to react. It was recognized that the absorption due to an acid anhydride group (1785 cm$^{-1}$) was lost in Infrared absorption spectrum analysis, then the product was discharged from the reaction vessel to obtain the polymer having a carboxyl group and a carboxylate group (a)-3. The acid value of the resulting polymer (a)-3 was 160 mgKOH/g.

Preparation Example 4

Preparation of polymer having a hydroxyl group and an epoxy group (b)-1

25 parts of xylene and 20 parts of propylene glycol monomethyl ether acetate were charged in a reaction vessel equipped with a thermometer, stirrer, cooling tube, nitrogen introducing tube and dropping funnel, and heated to 120° C. To this were added dropwise 20 parts of styrene, 28 parts of glycidyl methacrylate, 23 parts of "4HBA" (manufactured by Mitsubishi Kasei Co., Ltd.), 30 parts of cyclohexyl methacrylate and 8 parts of t-butyl peroxy 2-ethylhexanoate using the dropping funnel over 3 hours.

After completion of the dropping for 30 minutes, the mixture was kept at 120° C., and a solution composed of 1 part of t-butyl peroxy 2-ethylhexanoate and 2 parts of xylene was added dropwise over 30 minutes. Then, the reaction was further continued for 2 hours at 120° C. to obtain a varnish comprising the polymer having a hydroxyl group and an epoxy group (b)-1, which has an epoxy equivalent of 510 and a hydroxyl value of 90 mgKOH/g (solid component).

Preparation Example 5

Preparation of polymer having a hydroxyl group and an epoxy group (b)-2

A varnish comprising the polymer having a hydroxyl group and an epoxy group (b)-2, which has an epoxy equivalent of 623 and a hydroxyl value of 90 mgKOH/g (solid component) according to the same manner as in Preparation Example 4 except that the composition shown in Table 2 was used.

TABLE 2

| Composition | parts |
| --- | --- |
| Xylene | 95 |
| Styrene | 20 |
| Glycidyl methacrylate | 22.9 |
| Propylene glycol monomethyl ether acetate | 52.5 |
| 4-hydroxylbutyl acrylate | 23 |
| Cyclohexyl methacrylate | 34 |
| t-butyl peroxy 2-ethylhexanoate | 20 |
| Desolvation | −104 |

Preparation Example 6

Preparation of polyester (p)-1

213 parts of trimethylolpropane, 184 parts of isophthalic acid, 258 parts of hexahydrophthalic anhydride, 180 parts of neopentyl glycol, 72 parts of neopentyl glycol hydroxypivalate and 0.2 parts of dibutyl tin oxide were charged in a 2 L reaction vessel equipped with a thermometer, stirrer, cooling tube, nitrogen introducing tube, water separator and fractionating tower, and heated. When the raw materials were melted and stirring became possible, the stirring was initiated, and the temperature of the reaction vessel was controlled to 220° C. In this procedure, the temperature was raised at a constant speed from 180° C. to 220° C. over 3 hours. The produced condensation water was distilled out of the system. When the temperature reached 220° C., the temperature was maintained at this temperature for 1 hour, then 10 parts of xylene as a reflux solvent was gradually added into the reaction vessel, and the condensation reaction was continued. When the acid value of the polymer reached 10.0, the solution was cooled to 160° C., and 182 parts of "Placcel M" (manufactured by Daicel Chemical Industries, Ltd.) was added and the temperature was kept at the same temperature for 2 hours, then cooled to 100° C. To this was further added 270 parts of xylene to obtain a varnish comprising the oil-free polyester (p)-1.

Preparation Exam

Preparation Example 7

Preparation of crosslinked resin particles

To a reaction vessel equipped with a stirring and heating apparatus, thermometer, nitrogen introducing tube, cooling tube and decanter were added 213 parts of hydroxyethyltaurine, 208 parts of neopentyl glycol, 296 parts of phthalic anhydride, 376 parts of azelaic acid and 30 parts of xylene, and the mixture was heated. Water generated with the reaction was removed by azeotropic distillation with xylene. The temperature of the reaction solution was raised to 210° C. over 3 hours from the initiation of the reflux, and stirring and dehydration were continued until the acid value corresponding to a carboxylic acid reached 135. The solution was cooled to 140° C., then 500 parts of "Cardula E10" (glycidyl versatate manufactured by Shell Chemical Co.) was added dropwise over 30 minutes, then the reaction was stirred for 2 hours before completion of the reaction to obtain an ampholytic ion group-containing polyester resin having an acid value based on the solid component of 55, a hydroxyl value of 91 and a number average molecular weight of 1250.

10 parts of this ampholytic ion group-containing polyester resin, 140 parts of deionized water, 1 part of dimethylethanolamine, 50 parts of styrene and 50 parts of ethylene glycol dimethacrylate were stirred vigorously in a stainless beaker to prepare a monomer suspension. Further, 0.5 parts of azobiscyanovaleric acid, 40 parts of deionized water and 0.32 parts of dimethylethanolamine were mixed to prepare an aqueous initiator solution.

5 parts of the above-described ampholytic ion group-containing polyester resin, 280 parts of deionized water and 0.5 parts of dimethylethanolamine were charged in a reaction vessel equipped with a stirring and heating apparatus, thermometer, nitrogen introducing tube and cooling tube, and the mixture was heated to 80° C. To this were added dropwise the monomer suspension and 40.82 parts of the aqueous initiator solution simultaneously over 60 minute, and the reaction was continued for further 60 minutes before completion of the reaction to obtain an emulsion of crosslinked resin particles having a particle size of 55 nm measured by dynamic light scattering method.

Xylene was added to this emulsion, water was removed by azeotropic distillation under vaccum, the medium was substituted by xylene to obtain a xylene solution of crosslinked resin particles having a solid component content of 20% by weight.

Example A

Example A describes a colored coating composition containing the titanium oxide white pigment "Taypake CR-97" manufactured by Ishihara Sangyo K.K.

Example A1

(1) Preparation of pigment-dispersed paste 120 parts of the titanium oxide pigment "Taypake CR-97" manufactured by Ishihara Sangyo K.K. having an acid amount aP of 7 ($\mu$mol/g) and a base amount bP of 45 ($\mu$mol/g) which were derived from a pigment per 1 g of solid component, 5.8 parts of the pigment-dispersing agent "BYK 110" manufactured by Big Chemie Corp. having an acid amount aR of 1000 ($\mu$mol/g) and a base amount bR of 0 ($\mu$mol/g) which were derived from a pigment-dispersing agent per 1 g of solid component, 52.9 parts of the polymer having a hydroxyl group and an epoxy group (b)-1 obtained in Preparation Example 4 and 21.3 parts of 1/1 mixed solvent of the aromatic hydrocarbon solvent "S100" manufactured by Esso K.K. and propylene glycol monomethyl ether acetate were charged in a 200 ml vessel and dispersed at 2000 rpm for 3 hours using a portable sandmill (manufactured by Taihei System K.K.) at 25° C. to obtain a pigment-dispersed paste.

(2) Evaluation of pigment-dispersed paste

The resulted pigment-dispersed paste was subjected to the procedure shown below and paste gloss, paste yield value, curtain coating gloss and storage stability were evaluated. The results were shown in Table 3.

When the surface of pigment particles is sufficiently coated and adsorped by a pigment-dispersing agent, interaction between particles reduces to show low yield value. Further, re-flocculation of pigment particles which has once been ground is disturbed, consequently, dispersing speed and degree of dispersing increase, and high gloss is shown at a constant dispersing time.

Evaluation methods

Paste Gloss

A dispersed paste was curtain-coated on a glass plate and dried, then specular gloss values at 60° and 20° were measured, and the values were used as evaluation for degree of pigment dispersion. For measuring gloss, GM-26D type was used manufactured by Murakami Shikizai Seisakusho K.K.

Paste Yield Value

Yield value based on interaction between particles was measured by using a cone-plate type viscometer (E type manufactured by Tokyo Keiki Co., Ltd.). Shear rate was changed from 1.92 sec$^{-1}$ to 384 sec$^{-1}$, and yield value (dyne/cm$^2$) was calculated according to the Casson equation.

Curtain Coating Gloss of Coating Composition

The pigment-dispersed paste was mixed with each resin and other components to prepare a coating which was applied on a glass plate by curtain coating, and the coating was baked at 140° C. for 30 minutes, then, gloss values at 60° and 20° were measured by a gloss measuring apparatus.

Storage Stability of Coating Composition

The viscosity of the coating composition as obtained above was controlled to obtain a value corresponding to 30 seconds at 20° C. by Ford cup No. 4, this coating composition was stored for 7 days at 40° C., and change rate (%) of the viscosity before and after the storage was shown.

(3) Preparation of Colored Coating Composition 90 parts of the resulting pigment-dispersed paste, 50 parts of the polymer having a carboxyl group and a carboxylate group (a)-1 obtained in Preparation Example 1, 30 parts of the polymer having a hydroxyl group and an epoxy group (b)-1 obtained in Preparation Example 4, 20 parts of the polyester (p)-1 obtained in Preparation Example 6, 9 parts of the methylbutyl mixed alkylated melamine "Simel 202" manufactured by Mitsui Cyanamid K.K., 1.5 parts of dibutyl tin dodecylbenzenesulfonate "Scat 30" manufactured by Sankyo Yuki Gosei K.K., 1.3 parts of tetrabutylammonium bromide curing catalyst (TBABr), 0.1 part of surface regulating agent "Resimix RL-4" manufactured by Mitsui Toatsu Chemicals, Inc. and 5 parts of the xylene solution of the crosslinked resin particles obtained in Preparation Example 7 were formulated, and stirred for 30 minutes at room temperature to obtain a colored coating composition. The resulted colored coating composition had an acid total amount AR of 3000 ($\mu$mol) and a base total amount BR of 0 ($\mu$mol) which were derived from the pigment-dispersing agent, and an acid total amount AP of 840 ($\mu$mol) and a base total amount BP of 5400 ($\mu$mol) which were derived from the pigment.

The acid total amount and base total amount which were derived from the pigment-dispersing agent and the acid total amount and base total amount which were derived from the pigment were measured as described below.

Titration of Base Amount of Pigment 2 g of a titanium oxide pigment and 30 ml of $10^{-2}$M acetic acid.MIBK solution as an acid were charged in an Erlenmeyer flask, and the same procedure as described above was conducted to obtain a supernatant. 10 ml of this supernatant was diluted with a 4:1 mixed solution of MIBK and methanol, and titrated with $10^{-2}$M potassium methoxide solution. The amount of acetic acid which was consumed by the base on the surface of the pigment was measured to determine the base amount per unit weight of the pigment. The $10^{-2}$M potassium methoxide solution was prepared by diluting a benzene.methanol solution of $10^{-1}$M potassium methoxide for non-aqueous titration with 4:1 mixed solution of MIBK and methanol to give 10-fold large volume. The acid amount per 1 g of the pigment was represented by aP ($\mu$mol/g), and the acid total amount of the pigment in the formulation was represented by AP ($\mu$mol).

Titration of Acid Amount of Pigment 2 g of a titanium oxide pigment and 30 ml of $10^{-2}$M methyl isobutyl ketone (MIBK) solution of triethylamine as a base were charged in an Erlenmeyer flask and the flask was sealed, then the mixture was dispersed by ultrasonic wave for 1 hour in a ultrasonic wave washing apparatus controlled at 20° C. 10 ml of a supernatant which had been obtained by centrifugal separation of the pigment from this dispersed solution was diluted with 100 ml of MIBK, and titrated with $10^{-2}$M perchloric acid solution. The acid amount per unit weight of the pigment was determined by the amount of TEA consumed by the acid on the surface of the titanium oxide pigment. For this titration, an automatic titration apparatus (Hiranuma COM-900) was used, and a glass electrode was used as an indicating electrode and a silver-silver chloride electrode was used as a reference electrode. The perchloric acid solution was prepared by diluting $10^{-1}$M perchloric acid dioxane solution with MIBK to give 10-fold large volume. The base amount per 1 g of the pigment was represented by bP ($\mu$mol/g), and the base total amount of the pigment in the formulation was represented by BP ($\mu$mol).

Measuring method of Acid Base amount of Resin

The acid amount and base amount of a resin were also determined by potential difference titration according to the same manner as in the case of the pigment.

For measurement of the base amount, 1 g of a resin was dissolved in 100 ml of MIBK, the solution was titrated with $10^{-2}$N perchloric acid MIBK solution. The base amount of the resin was measured by the amount of the perchloric acid solution required for neutralization.

For measurement of the acid amount, 1 g of a resin was dissolved in 100 ml of 4:1 mixed solution of MIBK and methanol, the solution was titrated with $10^{-2}$N potassium methoxide solution (prepared by diluting benzene.methanol solution of $10^{-1}$N potassium methoxide for non-aqueous titration with 4:1 mixed solution of MIBK and methanol to give 10-fold large volume). The acid amount of the resin was measured by the amount of the potassium methoxide required for neutralization. The acid amount per 1 g of the solid component of the dispersing agent was represented by aR ($\mu$mol/g), and the acid total amount of the dispersing agent was by AR ($\mu$mol), and the base amount per 1 g of the solid component of the dispersing agent was represented by bR ($\mu$mol/g), and the acid total amount of the dispersing agent was by BR ($\mu$mol).

(4) Evaluation of colored coating composition

A colored coating composition was evaluated in terms of spray volumetric solid content (SVS) of a coating composition according to the method as described below.

Evaluation method

Volume solid component (SVS) of coating composition

The viscosity of the colored coating composition was controlled to 30 seconds at 20° C. by Ford cup No. 4. 0.5 g of this coating composition was weighed precisely, diluted with 3 ml of toluene, and applied on a substrate previously weighed. The substrate on which the colored coating composition was applied was baked for 1 hour at 110° C. to cure the coated film, and volumetric solid content was calculated from the weight of the cured coated film. Higher SVS shows lower evaporated solvent.

On the other hand, a cationic electrodeposition coating composition (Power top U-50 manufactured by Nippon Paint Co., Ltd.) was electrodeposited on 0.8 mm thick dull steel plate treated with zinc phosphate to give a thickness of the dried coated film of about 25 $\mu$m, and an intercoating ("Orga P-2" manufactured by Nippon Paint Co., Ltd.) was applied by an air spray on the resulting electrodeposited coated film to give a thickness of the dried coated film of about 40 μm, and the films were baked at 140° C. for 30 minutes. Then, the colored coating composition prepared as described above was controlled to obtain a viscosity corresponding to 25 seconds by Ford cup No. 4, coated on the intercoated film by an air spray to give an thickness of the dried coated film of about 40 μm, and subjected to set for about 7 minutes, then was baked for 30 minutes at 140° C. to provide a colored coated film. Appearance (visual) of the resulted colored coated film, acid resistance of the coated film, mar resistance of the coated film, volumetric solid content of the coated film and weather resistance of the coated film were evaluated. The results are shown in Tables 4 and 9.

Evaluation method

Appearance of Coated Film (visual)

Appearance (hazy looking) of the resulting coated film was visually evaluated.
o excellent
Δ slightly hazy
x hazy Acid Resistance of Coated Film 1% by weight of sulfuric acid solution was kept at 60° C., the test piece was immersed in this solution for 24 hours. Then, this was took out, and gloss retaining ratio (%) at 60° was measured. Evaluation was conducted according to the following criteria.

| Evaluation | Gloss retaining ratio (%) |
|---|---|
| ⊚ | Not less than 90 |
| ○ | 70–90 |
| Δ | 40–70 |
| X | not more than 40 |

Mar resistance of Coated Film

50% aqueous suspension of a cleanser manufactured by Kaneyo K.K. was applied on two layered flannel in an amount of about 1 ml, and the flannel was fixed on a sliding head of the Gakushin type friction fastness testing machine. The sliding head was reciprocated 10 times with a load of 700 g, then the 200 gloss was measured at the tested portion, and gloss retaining ratio was calculated. Evaluation criteria were the same as those of the above-described acid resistance of a coated film.

Example A2

(1) Preparation of pigment-dispersed paste

The same procedure as that of Example A1 was repeated except that 10.0 parts of the pigment dispersing agent "BYK 170" manufactured by Big Chemie Corp. having an acid amount aR of 530 (mol/g) and a base amount bR of 650 (μmol/g) which were derived from a pigment-dispersing agent per 1 g of solid component was used instead of "BYK 110", and the 1/1 mixed solvent of the aromatic hydrocarbon solvent "S100" manufactured by Esso K.K. and propylene glycol monomethyl ether acetate was used in an amount of 17.1 parts, to prepare a pigment-dispersed paste, and the paste was evaluated. The results were shown in Table 3.

(2) Preparation and evaluation of colored coating composition

The same procedure as that of Example A1 was repeated to prepare a colored coating composition and a colored coated film, and they were evaluated. The results were shown in Table 4. The resulted colored coating composition had an acid total amount AR of 1590 (μmol) and base total amount BR of 1950 (μmol) which were derived from the pigment dispersing agent, and an acid total amount AP of 840 (μmol) and base total amount BP of 5400 (μmol) which were derived from the pigment.

Example A3

(1) Preparation of pigment-dispersed paste

The same procedure as that of Example A1 was repeated except that 3.0 parts of the pigment-dispersing agent "SOLS26000" manufactured by Zeneka K.K. having an acid amount aR of 900 (μmol/g) and a base amount bR of 760 (μmol/g) which were derived from a pigment-dispersing agent per 1 g of solid component was used instead of "BYK 110" and the 1/1 mixed solvent of the aromatic hydrocarbon solvent "S100" manufactured by Esso K.K. and propylene glycol monomethyl ether acetate was used in an amount of 24.1 parts, to prepare a pigment-dispersed paste, and the paste was evaluated. The results were shown in Table 3.

(2) Preparation and evaluation of colored coating composition

The same procedure as that of Example A1 was repeated to prepare a colored coating composition and a colored coated film, and they were evaluated. The results were shown in Table 4. The resulted colored coating composition had an acid total amount AR of 2700 (μmol) and base total amount BR of 2280 (μmol) which were derived from the pigment dispersing agent, and an acid total amount AP of 840 (μmol) and base total amount BP of 5400 (μmol) which were derived from the pigment.

Example A4

The present example describes the preparation of high solid type colored coating composition.

Preparation and evaluation of colored coating composition 90 parts of the pigment-dispersed paste obtained in Example A1, 50 parts of the polymer having a carboxyl group and a carboxylate group (a)-2 obtained in Preparation Example 2, 25 parts of the polymer having a hydroxyl group and an epoxy group (b)-2 obtained in Preparation Example 5, 20 parts of the polyester (p)-1 obtained in Preparation Example 6, 9 parts of the methylbutyl mixed alkylated melamine "Cymel 202" manufactured by Mitsui Cyanamid K.K., 7 parts of the silicone polymer "F-244-09" having an epoxy equivalent of 318 and an alkoxy equivalent of 213, which has an epoxy group and an alkoxy group represented by the general formula (II) in which $R^1$ is methyl group, $R^2$ is γ-glycidoxypropyl group/(trimethoxysilyl)ethyl group=2/1, $R^3$, $R^4$, $R^5$, $R^6$ are a methyl group, l=6, m=2, n=0, manufactured by Nippon Unicar K.K., 1.5 parts of dibutyl tin dodecylbenzenesulfonate "Scat 30" manufactured by Sankyo Yuki Gosei K.K., 1.5 parts of tetrabutylammonium bromide curing catalyst, 0.1 part of the surface regulating agent "Resimix RL-4" manufactured by Mitsui Toatsu Chemicals, Inc. and 5 parts of the xylene solution of the crosslinked resin particles obtained in Preparation Example 7 were formulated, and stirred for 30 minutes at room temperature to obtain a colored coating composition.

Then, this colored coating composition was evaluated according to the same manner as in Example A1. The results are shown in Tables 3 and 4.

Example A5

90 parts of the pigment-dispersed paste obtained in Example A1, 50 parts of the polymer having a carboxyl group and a carboxylate group (a)-1 obtained in Preparation Example 1, 30 parts of the polymer having a hydroxyl group and an epoxy group (b)-1 obtained in Preparation Example 4, 1.5 parts of dibutyl tin dodecylbenzenesulfonate "Scat 30" manufactured by Sankyo Yuki Gosei K.K., 1.3 parts of tetrabutylammonium bromide curing catalyst, 0.1 part of the surface regulating agent "Resimix RL-4" manufactured by Mitsui Toatsu Chemicals, Inc. and 5 parts of the xylene solution of the crosslinked resin particles obtained in Preparation Example 7 were formulated, and stirred for 30 minutes at room temperature to obtain a colored coating composition.

Then, this colored coating composition was evaluated according to the same manner as in Example A1. The results are shown in Table 4.

Comparative Example A1

(1) Preparation and evaluation of pigment-dispersed paste 120 parts of the titanium oxide pigment "Taypake CR-97" manufactured by Ishihara Sangyo K.K. having an acid amount aP of 7 ($\mu$mol/g) and a base amount bP of 45 ($\mu$mol/g) which were derived from a pigment per 1 g of solid component, 57.1 parts of the polymer having a hydroxyl group and an epoxy group (b)-1 obtained in Preparation Example 4 and 22.9 g of 1/1 mixed solvent of the aromatic hydrocarbon solvent "S100" manufactured by Esso K.K. and propylene glycol monomethyl ether acetate were charged in 200 ml vessel and dispersed at 2000 rpm for 3 hours using a portable sandmill (manufactured by Taihei System K.K.) at 25° C. to obtain a pigment-dispersed paste, and this paste was evaluated according to the same manner as in Example A1. The results are shown in Table 3.

(2) Preparation and evaluation of colored coating composition

The same procedure as that of Example A1 was repeated to prepare a colored coating composition and a colored coated film, and they were evaluated. The results were shown in Table 4. The resulted colored coating composition had an acid total amount AR of 0 ($\mu$mol/g) and base total amount BR of 0 ($\mu$mol/g) which were derived from the pigment dispersing agent, and an acid total amount AP of 840 ($\mu$mol/g) and base total amount BP of 5400 ($\mu$mol) which were derived from the pigment.

Comparative Example A2

(1) Preparation and evaluation of pigment-dispersed paste 120 parts of the titanium oxide pigment "Taypake CR-97" manufactured by Ishihara Sangyo K.K. having an acid amount aP of 7 ($\mu$mol/g) and a base amount bP of 45 ($\mu$mol/g) which were derived from a pigment per 1 g of solid component, 2.9 parts of the pigment-dispersing agent "BYK 110" manufactured by Big Chemie Corp. having an acid amount aR of 1000 ($\mu$mol/g) and a base amount bR of 0 ($\mu$mol/g) which were derived from a pigment-dispersing agent per 1 g of solid component, 55.0 parts of the polymer having a hydroxyl group and an epoxy group (b)-1 obtained in Preparation Example 4 and 22.1 parts of 1/1 mixed solvent of the aromatic hydrocarbon solvent "S100" manufactured by Esso K.K. and propylene glycol monomethyl ether acetate were charged in a 200 ml vessel and dispersed at 2000 rpm for 3 hours using a portable sandmill (manufactured by Taihei System K.K.) at 25° C. to obtain a pigment-dispersed paste, and this paste was evaluated according to the same manner as in Example A1. The results are shown in Table 3.

(2) Preparation and evaluation of colored coating composition

The same procedure as that of Example A1 was repeated to prepare a colored coating composition and a colored coated film, and they were evaluated. The results were shown in Table 4. The resulted colored coating composition had an acid total amount AR of 1500 ($\mu$mol) and base total amount BR of 0 ($\mu$mol) which were derived from the pigment-dispersing agent, and an acid total amount AP of 840 ($\mu$mol) and base total amount BP of 5400 ($\mu$mol) which were derived from the pigment.

Comparative Example A3

(1) Preparation and evaluation of pigment-dispersed paste 120 parts of the titanium oxide pigment "Taypake CR-97" manufactured by Ishihara Sangyo K.K. having an acid amount aP of 7 ($\mu$mol/g) and a base amount bP of 45 ($\mu$mol/g) which were derived from a pigment per 1 g of solid component, 3.0 parts of a pigment-dispersing agent "SOLS270000" manufactured by Zeneka K.K. having an acid amount aR of 0 ($\mu$mol/g) and a base amount bR of 15 ($\mu$mol/g) which were derived from a pigment-dispersing agent per 1 g of solid component, 52.9 parts of the polymer having a hydroxyl group and an epoxy group (b)-1 obtained in Preparation Example 4 and 24.1 parts of 1/1 mixed solvent of the aromatic hydrocarbon solvent "S100" manufactured by Esso K.K. and propylene glycol monomethyl ether acetate were charged in a 200 ml vessel and dispersed at 2000 rpm for 3 hours using a portable sandmill (manufactured by Taihei System K.K.) at 25° C. to obtain a pigment-dispersed paste, and this paste was evaluated according to the same manner as in Example A1. The results were shown in Table 3.

(2) Preparation and evaluation of colored coating composition

The same procedure as that of Example A1 was repeated to prepare a colored coating composition and a colored coated film, and they were evaluated. The results were shown in Table a. The resulted colored coating composition had an acid total amount AR of 0 ($\mu$mol) and base total amount BR of 45 ($\mu$mol) which were derived from the pigment-dispersing agent, and an acid total amount AP of 840 ($\mu$mol) and base total amount BP of 5400 ($\mu$mol) which were derived from the pigment.

Comparative Example A4

(1) Preparation and evaluation of pigment-dispersed paste 120 parts of the titanium oxide pigment "Taypake CR-97" manufactured by Ishihara Sangyo K.K. having an acid amount aP of 7 ($\mu$mol/g) and a base amount bP of 45

($\mu$mol/g) which were derived from a pigment per 1 g of solid component, 10.0 parts of the pigment-dispersing agent "BYK 161" manufactured by Big Chemie Corp. having an acid amount aR of 0 ($\mu$mol/g) and a base amount bR of 690 ($\mu$mol/g) which were derived from a pigment-dispersing agent per 1 g of solid component, 52.9 parts of the polymer having a hydroxyl group and an epoxy group (b)-1 obtained in Preparation Example 4 and 17.1 g of 1/1 mixed solvent of the aromatic hydrocarbon solvent "S100" manufactured by Esso K.K. and propylene glycol monomethyl ether acetate were charged in a 200 ml vessel and dispersed at 2000 rpm for 3 hours using a portable sandmill (manufactured by Taihei System K.K.) at 25° C. to obtain a pigment-dispersed paste, and this paste was evaluated according to the same manner as in Example A1. The results were shown in Table 3.

(2) Preparation and evaluation of colored coating composition

The same procedure as that of Example A1 was repeated to prepare a colored coating composition and a colored coated film, and they were evaluated. The results were shown in Table 4. The resulted colored coating composition had an acid total amount AR of 0 ($\mu$mol) and base total amount BR of 2070 ($\mu$mol) which were derived from the pigment-dispersing agent, and an acid total amount AP of 840 ($\mu$mol) and base total amount BP of 5400 ($\mu$mol) which were derived from the pigment.

TABLE 3

|  | Evaluation of dispersed paste | | Evaluation of coating composition | |
| --- | --- | --- | --- | --- |
|  | Gloss of paste (60°/20°) | Yield value (dyne/cm²) | Gloss of curtain coating (60°/20°) | Storage stability (change rate (%)) |
| Example A1 | 86/67 | 1.3 | 80/68 | 5 |
| Example A2 | 83/64 | 1.5 | 78/62 | 25 |
| Example A3 | 81/60 | 1.5 | 79/63 | 23 |
| Example A4 | 78/54 | 1.3 | 79/61 | 28 |
| Example A5 | 80/60 | 1.4 | 78/63 | 26 |
| Comparative Example A1 | 69/38 | 5.6 | 63/31 | 20 |
| Comparative Example A2 | 73/44 | 4.9 | 65/35 | 15 |
| Comparative Example A3 | 65/26 | 7.8 | 60/29 | 20 |
| Comparative Example A4 | 84/65 | 2.0 | 81/65 | 370 |

Examples A1 to A5 of the present invention show high gloss of a paste and low yield value as compared with Comparative Example A1 containing no pigment-dispersing agent. Further, also high gloss of curtain coating which is a practical property is obtained in Examples A1 to A5.

On the other hand, Comparative Examples A1 to A3 do not satisfy the condition of AR>0.5 BP or BR>0.5 AP, and gloss of a paste, yield value, gloss of curtain coating are insufficient. Further, Comparative Example A4 does not satisfy the condition of BR<AR+AP, and viscosity of the coating increases steeply during storage.

TABLE 4

|  | Acid resistance | Scratch resistance | SVS | Visual appearance |
| --- | --- | --- | --- | --- |
| Example A1 | ◎ | ○ | 43 | ○ |
| Example A2 | ◎ | ○ | 45 | ○ |
| Example A3 | ◎ | ○ | 44 | ○ |
| Example A4 | ◎ | ○ | 50 | ○ |
| Example A5 | ◎ | ○ | 43 | ○ |
| Comparative Example A1 | ◎ | ○ | 44 | X |
| Comparative Example A2 | ◎ | ○ | 44 | X |
| Comparative Example A3 | ◎ | ○ | 44 | X |

Comparative Examples A1 to A3 show low value of 20° gloss in curtain coating, and are poor in evaluation of visual appearance (hazy looking).

Example B

Example B describes a colored coating composition containing the iron oxide red pigment "Biferox 120FS" manufactured by Bayer Ltd.

Example B1

(1) Preparation of pigment-dispersed paste 120 parts of the iron oxide red pigment "Biferox 120FS" manufactured by Bayer Ltd. having an acid amount aP of 10 ($\mu$mol/g) and a base amount bP of 31 ($\mu$mol/g) which were derived from a pigment per 1 g of solid component, 5.8 parts of the pigment-dispersing agent "BYK 110" manufactured by Big Chemie Corp. having an acid amount aR of 1000 ($\mu$mol/g) and a base amount bR of 0 ($\mu$mol/g) which were derived from a pigment-dispersing agent per 1 g of solid component, 52.9 parts of the polymer (b)-1 obtained in Preparation Example 4 and 21.3 g of 1/1 mixed solvent of the aromatic hydrocarbon solvent "S100" manufactured by Esso K.K. and propylene glycol monomethyl ether acetate were charged in a 200 ml vessel and dispersed at 2000 rpm for 3 hours using a portable sandmill (manufactured by Taihei System K.K.) at 25° C. to obtain a pigment-dispersed paste.

(2) Evaluation of pigment-dispersed paste

The resulted pigment-dispersed paste was evaluated according to the same manner as in Example A1 regarding paste gloss, paste yield value, curtain coating gloss and storage stability. The results were shown in Table 5.

(3) Preparation of Colored Coating Composition 18.3 parts of the resulting pigment-dispersed paste, 41 parts of the polymer having a carboxyl group and a carboxylate group (a)-1 obtained in Preparation Example 1, 46 parts of the polymer having a hydroxyl group and an epoxy group (b)-1 obtained in Preparation Example 4, 20 parts of the polyester (p)-1 obtained in Preparation Example 6, 9 parts of the methylbutyl mixed alkylated melamine "Cymel 202" manufactured by Mitsui Cyanamid K.K. 1.5 parts of the dibutyl tin dodecylbenzenesulfonate "Scat 30" manufactured by Sankyo Yuki Gosei K.K. and 1.3 parts of tetrabutylammonium bromide curing catalyst were formulated, and stirred for 30 minutes at room temperature to obtain a colored coating composition. The resulted colored coating composition had an acid total amount AR of 3000 ($\mu$mol)

and a base total amount BR of 0 (μmol) which were derived from the pigment-dispersing agent, and an acid total amount AP of 1200 (μmol) and a base total amount BP of 3720 (μmol) which were derived from the pigment.

(4) Evaluation of colored coating composition

The resulted colored coating composition was evaluated according to the same manner as in Example A1 regarding spray volumetric solid content (SVS) of a coating composition, acid resistance of a coated film, mar resistance of a coated film and appearance of a coated film. The results are shown in Table 6.

Example B2

(1) Preparation and evaluation of pigment-dispersed paste

The same procedure as that of Example B1 was repeated except that 4.7 parts of "BYK 182" manufactured by Big Chemie Corp. having an acid amount aR of 0 (μmol/g) and a base amount bR of 550 (μmol/g) which were derived from a pigment-dispersing agent per 1 g of solid component was used instead of "BYK 110", and the 1/1 mixed solvent of the aromatic hydrocarbon solvent "S100" manufactured by Esso K.K. and propylene glycol monomethyl ether acetate was used in an amount of 22.4 parts, to prepare a pigment-dispersed paste, and the paste was evaluated. The results were shown in Table 5.

(2) Preparation and evaluation of colored coating composition

The same procedure as that of Example B1 was repeated to prepare a colored coating composition and a colored coated film, and they were evaluated. The results were shown in Table 6. The resulted colored coating composition had an acid total amount AR of 0 (μmol) and base total amount BR of 1100 (μmol) which were derived from the pigment dispersing agent, and an acid total amount AP of 1200 (μmol) and base total amount BP of 3700 (μmol) which were derived from the pigment.

Example B3

(1) Preparation and evaluation of pigment-dispersed paste

The same procedure as that of Example B1 was repeated except that 3.0 parts of the pigment-dispersing agent "SOLS26000" manufactured by Zeneka K.K. having an acid amount aR of 900 (μmol/g) and a base amount bR of 760 (μmol/g) which were derived from a pigment-dispersing agent per 1 g of solid component was used instead of "BYK 110", and the 1/1 mixed solvent of the aromatic hydrocarbon solvent "S100" manufactured by Esso K.K. and propylene glycol monomethyl ether acetate was used in an amount of 24.1 parts, to prepare a pigment-dispersed paste, and the paste was evaluated. The results were shown in Table 5.

(2) Preparation and evaluation of colored coating composition

The same procedure as that of Example B1 was repeated to prepare a colored coating composition and a colored coated film, and they were evaluated. The results were shown in Table b. The resulted colored coating composition had an acid total amount AR of 2700 (μmol) and base total amount BR of 2280 (μmol) which were derived from the pigment dispersing agent, and an acid total amount AP of 1200 (μmol) and base total amount BP of 3720 (μmol) which were derived from the pigment.

Comparative Example B1

(1) Preparation and evaluation of pigment-dispersed paste 120 parts of the iron oxide red pigment "Biferox 120FS" manufactured by Bayer Ltd. having an acid amount aP of 10 (μmol/g) and a base amount bP of 31 (μmol/g) which were derived from a pigment per 1 g of solid component, 57.1 parts of the polymer (b)-1 obtained in Preparation Example 4 and 22.9 g of 1/1 mixed solvent of the aromatic hydrocarbon solvent "S100" manufactured by Esso K.K. and propylene glycol monomethyl ether acetate were charged in a 200 ml vessel and dispersed at 2000 rpm for 3 hours using a portable sandmill (manufactured by Taihei System K.K.) at 25° C. to obtain a pigment-dispersed paste.

(2) Preparation and evaluation of colored coating composition

The same procedure as that of Example B1 was repeated except that the amount blended of the polymer having a hydroxyl group and an epoxy group (b)-1 obtained in Preparation Example 4 was 65 parts, to prepare a colored coating composition and a colored coated film, and they were evaluated. The results were shown in Table 5. The resulted colored coating composition had an acid total amount AR of 0 (μmol) and base total amount BR of 0 (μmol) which were derived from the pigment dispersing agent, and an acid total amount AP of 1200 (μmol) and base total amount BP of 3720 (μmol) which were derived from the pigment.

Comparative Example B2

(1) Preparation and evaluation of pigment-dispersed paste 120 parts of the iron oxide red pigment "Biferox 120FS" manufactured by Bayer Ltd. having an acid amount aP of 10 (μmol/g) and a base amount bP of 31 (μmol/g) which were derived from a pigment per 1 g of solid component, 2.9 parts of the pigment-dispersing agent "BYK 110" manufactured by Big Chemie Corp. having an acid amount aR of 1000 (μmol/g) and a base amount bR of 0 (μmol/g) which were derived from a pigment-dispersing agent per 1 g of solid component, 55.0 parts of the polymer (b)-1 obtained in Preparation Example 4 and 22.1 g of 1/1 mixed solvent of the aromatic hydrocarbon solvent "S100" manufactured by Esso K.K. and propylene glycol monomethyl ether acetate were charged in a 200 ml vessel and dispersed at 2000 rpm for 3 hours using a portable sandmill (manufactured by Taihei System K.K.) at 25° C. to obtain a pigment-dispersed paste, and this paste was evaluated according to the same manner as in Example B1. The results are shown in Table 5.

(2) Preparation and evaluation of colored coating composition

The same procedure as that of Example B1 was repeated except that the polymer having a hydroxyl group and an epoxy group (b)-1 obtained in Preparation Example 4 was used in an amount of 65 parts, to prepare a colored coating composition and a colored coated film, and they were evaluated. The results were shown in Table 6. The resulted colored coating composition had an acid total amount AR of 1500 (μmol) and base total amount BR of 0 (μmol) which were derived from the pigment-dispersing agent, and an acid total amount AP of 1200 (μmol) and base total amount BP of 3720 (μmol) which were derived from the pigment.

Comparative Example B3

(1) Preparation and evaluation of pigment-dispersed paste 120 parts of the iron oxide red pigment "Biferox 120FS" manufactured by Bayer Ltd. having an acid amount aP of 10 (μmol/g) and a base amount bP of 31 (μmol/g) which were derived from a pigment per 1 g of solid component, 3.0 parts of the pigment-dispersing agent "SOLS270000" manufactured by Zeneka K.K. having an acid amount aR of 0 (μmol/g) and a base amount bR of 15 (μmol/g) which were derived from a pigment-dispersing agent per 1 g of solid component, 52.9 parts of the polymer (b)-i obtained in Preparation Example 4 and 24.1 g of 1/1 mixed solvent of the aromatic hydrocarbon solvent "S100" manufactured by Esso K.K. and propylene glycol monomethyl ether acetate were charged in a 200 ml vessel and dispersed at 2000 rpm for 3 hours using a portable sandmill (manufactured by Taihei System K.K.) at 25° C. to obtain a pigment-dispersed paste, and this paste was evaluated according to the same manner as in Example B1. The results are shown in Table 5.

(2) Preparation and evaluation of colored coating composition

The same procedure as that of Example B1 was repeated except that the polymer having a hydroxyl group and an epoxy group (b)-1 obtained in Preparation Example 4 was 65 parts, to prepare a colored coating composition and a colored coated film, and they were evaluated. The results were shown in Table 6. The resulted colored coating composition had an acid total amount AR of 0 (μmol) and base total amount BR of 45 (μmol) which were derived from the pigment-dispersing agent, and an acid total amount AP of 1200 (μmol) and base total amount BP of 3720 (μmol) which were derived from the pigment.

Comparative Example B4

(1) Preparation and evaluation of pigment-dispersed paste 120 parts of the iron oxide red pigment "Biferox 120FS" manufactured by Bayer Ltd. having an acid amount aP of 10 (μmol/g) and a base amount bP of 31 (μmol/g) which were derived from a pigment per 1 g of solid component, 11.6 parts of the pigment-dispersing agent "BYK 182" manufactured by Big Chemie Corp. having an acid amount aR of 0 (μmol/g) and a base amount bR of 550 (μmol/g) which were derived from a pigment-dispersing agent per 1 g of solid component, 52.9 parts of the polymer (b)-1 obtained in Preparation Example 4 and 15.5 g of 1/1 mixed solvent of the aromatic hydrocarbon solvent "S100" manufactured by Esso K.K. and propylene glycol monomethyl ether acetate were charged in a 200 ml vessel and dispersed at 2000 rpm for 3 hours using a portable sandmill (manufactured by Taihei System K.K.) at 25° C. to obtain a pigment-dispersed paste, and this paste was evaluated according to the same manner as in Example B1. The results are shown in Table 5.

(2) Preparation and evaluation of colored coating composition

The same procedure as that of Example B1 was repeated except that the amount blended of the polymer having a hydroxyl group and an epoxy group (b)-1 obtained in Preparation Example 4 was 65 parts, to prepare a colored coating composition and a colored coated film, and they were evaluated. The results were shown in Table 6. The resulted colored coating composition had an acid total amount AR of 0 (μmol) and base total amount BR of 2750 (μmol) which were derived from the pigment-dispersing agent, and an acid total amount AP of 1200 (μmol) and base total amount BP of 3720 (μmol) which were derived from the pigment.

TABLE 5

| | Evaluation of colored paste | | Evaluation of coating composition | |
|---|---|---|---|---|
| | Gloss of paste (60°/20°) | Yield value (dyne/cm$^2$) | Gloss of curtain coating (60°/20°) | Storage stability (change rate (%)) |
| Example B1 | 81/62 | 1.8 | 79/66 | 3 |
| Example B2 | 78/58 | 0.3 | 78/64 | 23 |
| Example B3 | 82/59 | 2.0 | 80/67 | 18 |
| Comparative Example B1 | 63/20 | 4.8 | 55/38 | 20 |
| Comparative Example B2 | 65/27 | 4.2 | 58/40 | 15 |
| Comparative Example B3 | 60/17 | 5.3 | 51/29 | 17 |
| Comparative Example B4 | 85/66 | 1.5 | 80/68 | 1060 |

Examples B1 to B3 of the present invention show high gloss of a paste and low yield value as compared with Comparative Example B1 containing no pigment-dispersing agent. Further, also high gloss of curtain coating which is a practical property is obtained in Examples B1 to B3.

On the other hand, Comparative Examples B1 to B3 do not satisfy the condition of AR>0.5 BP or BR>0.5 AP, and dispersion degree of a paste, yield value, gloss of curtain coating are insufficient. Further, Comparative Example B4 does not satisfy the condition of BR<AR+AP, and viscosity of the coating increases steeply during storage.

TABLE 6

| | Acid resistance | Scratch resistance | SVS | Visual appearance |
|---|---|---|---|---|
| Example B1 | ⊙ | ○ | 44 | ○ |
| Example B2 | ⊙ | ○ | 43 | ○ |
| Example B3 | ⊙ | ○ | 43 | ○ |
| Comparative Example B1 | ⊙ | ○ | 43 | ○ |
| Comparative Example B2 | ⊙ | ○ | 43 | X |
| Comparative Example B3 | ⊙ | ○ | 40 | X |

Comparative Examples show low value of 20° gloss in curtain coating, and are poor in evaluation of visual appearance (hazy looking).

Example C

Example C describes a colored coating composition containing carbon black.

Example C1

(1) Preparation of pigment-dispersed paste 9.0 parts of the carbon black "FW 200P" manufactured by Degussa Corp. having an acid amount aP of 850 (μmol/g)

and a base amount bP of 0 (µmol/g) which were derived from a pigment-dispersing agent per 1 g of solid component, 20.9 parts of the pigment-dispersing agent "BYK 182" manufactured by Big Chemie Corp. having an acid amount aR of 0 (µmol/g) and a base amount bR of 550 (µmol/g) which were derived from a pigment-dispersing agent per 1 g of solid component, 41.5 parts of the polymer having a hydroxyl group and an epoxy group (b)-1 obtained in Preparation Example 4 and 28.6 parts of 1/1 mixed solvent of the aromatic hydrocarbon solvent "S100" manufactured by Esso K.K. and propylene glycol monomethyl ether acetate were charged in a 200 ml vessel and dispersed at 3000 rpm for 10 hours using a portable sandmill (manufactured by Taihei System K.K.) at 25° C. to obtain a pigment-dispersed paste.

(2) Evaluation of pigment-dispersed paste

The resulted pigment-dispersed paste was evaluated according to the same manner as in Example A1 regarding paste gloss, paste yield value, curtain coating gloss and storage stability. The results were shown in Table 7.

(3) Preparation of colored coating composition 33 parts of the resulting pigment-dispersed paste, 50 parts of the polymer having a carboxyl group and a carboxylate group (a)-1 obtained in Preparation Example 1, 35 parts of the polymer having a hydroxyl group and an epoxy group (b)-1 obtained in Preparation Example 4, 20 parts of the polyester (p)-1 obtained in Preparation Example 6, 9 parts of the methylbutyl mixed alkylated melamine "Cymel 202" manufactured by Mitsui Cyanamid K.K., 1.5 parts of dibutyl tin dodecylbenzenesulfonate "Scat 30" manufactured by Sankyo Yuki Gosei K.K., 1.3 parts of tetrabutylammonium bromide curing catalyst, 0.1 part of the surface regulating agent "Resimix RL-4" manufactured by Mitsui Toatsu Chemicals, Inc. and 5 parts of the xylene solution of the crosslinked resin particles obtained in Preparation Example 7 were formulated, and stirred for 30 minutes at room temperature to obtain a colored coating composition. The resulted colored coating composition had an acid total amount AR of 0 (µmol) and a base total amount BR of 4950 (µmol) which were derived from the pigment-dispersing agent and an acid total amount AP of 7650 (µmol) and a base total amount BP of 0 (µmol) which were derived from the pigment.

(4) Evaluation of colored coating composition

The resulted colored coating composition was evaluated according to the same manner as in Example A1 regarding spray volumetric solid content (SVS) of a coating composition, acid resistance of a coated film, mar resistance of a coated film, appearance of a coated film and weather resistance. The results are shown in Tables 8 and 9.

Example C2

(1) Preparation and evaluation of pigment-dispersed paste 9.0 parts of the carbon black "FW 200P" manufactured by Degussa Corp. having an acid amount aP of 850 (µmol/g) and a base amount bP of 0 (µmol/g) which were derived from a pigment per 1 g of solid component, 15.0 parts of the pigment-dispersing agent "BYK 166" manufactured by Big Chemie Corp. having an acid amount aR of 0 (µmol/g) and a base amount bR of 1190 (µmol/g) which were derived from a pigment-dispersing agent per 1 g of solid component, 48.5 parts of the polymer having a hydroxyl group and an epoxy group (b)-1 obtained in Preparation Example 4 and 27.5 parts of 1/1 mixed solvent of the aromatic hydrocarbon solvent "S100" manufactured by Esso K.K. and propylene glycol monomethyl ether acetate were charged in a 200 ml vessel and dispersed at 3000 rpm for 10 hours using a portable sandmill (manufactured by Taihei System K.K.) at 25° C. to obtain a pigment-dispersed paste. The resulted pigment-dispersed paste was evaluated according to the same manner as in Example C1. The results are shown in Table 7.

(2) Preparation and evaluation of colored coating composition

The same procedure as that of Example C1 was repeated to prepare a colored coating composition and a colored coated film, and they were evaluated. The results were shown in Table 8. The resulted colored coating composition had an acid total amount AR of 0 (µmol) and base total amount BR of 5355 (µmol) which were derived from the pigment dispersing agent, and an acid total amount AP of 7650 (µmol) and base total amount BP of 0 (µmol) which were derived from the pigment.

Example C3

(1) Preparation and evaluation of pigment-dispersed paste 9.0 parts of the carbon black "# 2500B" manufactured by Mitsubishi Kasei Co., Ltd. having an acid amount aP of 270 (µmol/g) and a base amount bP of 30 (µmol/g) which were derived from a pigment per 1 g of solid component, 10.5 parts of the pigment-dispersing agent "BYK 182" manufactured by Big Chemie Corp. having an acid amount aR of 0 (µmol/g) and a base amount bR of 550 (µmol/g) which were derived from a pigment-dispersing agent per 1 g of solid component, 48.5 parts of the polymer having a hydroxyl group and an epoxy group (b)-1 obtained in Preparation Example 4 and 32.0 parts of 1/1 mixed solvent of the aromatic hydrocarbon solvent "S100" manufactured by Esso K.K. and propylene glycol monomethyl ether acetate were charged in a 200 ml vessel and dispersed at 3000 rpm for 10 hours using a portable sandmill (manufactured by Taihei System K.K.) at 25° C. to obtain a pigment-dispersed paste. The resulted pigment-dispersed paste was evaluated according to the same manner as in Example C1. The results are shown in Table 7.

(2) Preparation and evaluation of colored coating composition

The same procedure as that of Example C1 was repeated to prepare a colored coating composition and a colored coated film, and they were evaluated. The results were shown in Table 8. The resulted colored coating composition had an acid total amount AR of 0 (µmol) and base total amount BR of 2475 (µmol) which were derived from the pigment dispersing agent, and an acid total amount AP of 2430 (µmol) and base total amount BP of 270 (µmol) which were derived from the pigment.

Example C4

(1) Preparation and evaluation of pigment-dispersed paste 9.0 parts of the pigment "# 2700B" manufactured by Mitsubishi Kasei Co., Ltd. having an acid amount aP of 300

($\mu$mol/g) and a base amount bP of 30 ($\mu$mol/g) which were derived from a pigment per 1 g of solid component, 10.5 parts of the pigment-dispersing agent "BYK 182" manufactured by Big Chemie Corp. having an acid amount aR of 0 ($\mu$mol/g) and a base amount bR of 550 ($\mu$mol/g) which were derived from a pigment-dispersing agent per 1 g of solid component, 48.5 parts of the polymer having a hydroxyl group and an epoxy group (b)-1 obtained in Preparation Example 4 and 32.0 parts of 1/1 mixed solvent of the aromatic hydrocarbon solvent "S100" manufactured by Esso K.K. and propylene glycol monomethyl ether acetate were charged in a 200 ml vessel and dispersed at 3000 rpm for 10 hours using a portable sandmill (manufactured by Taihei System K.K.) at 25° C. to obtain a pigment-dispersed paste. The resulted pigment-dispersed paste was evaluated according to the same manner as in Example C1. The results are shown in Table 7.

(2) Preparation and evaluation of colored coating composition

The same procedure as that of Example C1 was repeated to prepare a colored coating composition and a colored coated film, and they were evaluated. The results were shown in Table 8. The resulted colored coating composition had an acid total amount AR of 0 ($\mu$mol) and base total amount BR of 2475 ($\mu$mol) which were derived from the pigment dispersing agent, and an acid total amount AP of 2700 ($\mu$mol) and base total amount BP of 270 ($\mu$mol) which were derived from the pigment.

Example C5

(1) Preparation and evaluation of pigment-dispersed paste 9.0 parts of the pigment "# 2700B" manufactured by Mitsubishi Kasei Co., Ltd. having an acid amount aP of 300 ($\mu$mol/g) and a base amount bP of 30 ($\mu$mol/g) which were derived from a pigment per 1 g of solid component, 3.0 parts of the pigment-dispersing agent "Sols 20000" manufactured by Zeneka K.K. having an acid amount aR of 0 ($\mu$mol/g) and a base amount bR of 650 ($\mu$mol/g) which were derived from a pigment-dispersing agent per 1 g of solid component, 52.9 parts of the polymer having a hydroxyl group and an epoxy group (b)-1 obtained in Preparation Example 4 and 35.1 parts of 1/1 mixed solvent of the aromatic hydrocarbon solvent "S100" manufactured by Esso K.K. and propylene glycol monomethyl ether acetate were charged in a 200 ml vessel and dispersed at 3000 rpm for 10 hours using a portable sandmill (manufactured by Taihei System K.K.) at 25° C. to obtain a pigment-dispersed paste. The resulted pigment-dispersed paste was evaluated according to the same manner as in Example C1. The results are shown in Table 7.

(2) Preparation and evaluation of colored coating composition

The same procedure as that of Example C1 was repeated to prepare a colored coating composition and a colored coated film, and they were evaluated. The results were shown in Table 8. The resulted colored coating composition had an acid total amount AR of 0 ($\mu$mol) and base total amount BR of 1950 ($\mu$mol) which were derived from the pigment dispersing agent, and an acid total amount AP of 2700 ($\mu$mol) and base total amount BP of 270 ($\mu$mol) which were derived from the pigment.

Example C6

The present example describes the preparation of a high solid type colored coating composition.

Preparation and evaluation of colored coating composition 33 parts of the pigment-dispersed paste obtained in Example C3, 54 parts of the polymer having a carboxyl group and a carboxylate group (a)-3 obtained in Preparation Example 3, 38 parts of the polymer having a hydroxyl group and an epoxy group (b)-2 obtained in Preparation Example 5, 7 parts of the silicone polymer "F-244-09" having an epoxy equivalent of 318 and an alkoxy equivalent of 213, which has an epoxy group and an alkoxy group represented by the general formula (II) in which $R^1$ is methyl group, $R^2$ is $\gamma$-glycidoxypropyl group/(trimethoxysilyl)ethyl group=2/1, $R^3$, $R^4$, $R^5$, $R^6$ are a methyl group, l=6, m=2, n=0, manufactured by Nippon Unicar K.K., 16 parts of the polyester (p)-1 obtained in Preparation Example 6, 8 parts of the methylbutyl mixed alkylated melamine "Cymel 325" manufactured by Mitsui Cyanamid K.K., 1.5 parts of dibutyl tin dodecylbenzenesulfonate "Scat 30" manufactured by Sankyo Yuki Gosei K.K., 1.3 parts of tetrabutylammonium bromide curing catalyst and 0.1 part of the surface regulating agent "Resimix RL-4" manufactured by Mitsui Toatsu Chemicals, Inc. were formulated, and stirred for 30 minutes at room temperature to obtain a colored coating composition.

Then, this colored coating composition was evaluated according to the same manner as in Example C1. The results are shown in Table 8.

Comparative Example C1

(1) Preparation and evaluation of pigment-dispersed paste 9.0 parts of the carbon black "FW 200P" manufactured by Degussa Corp. having an acid amount aP of 850 ($\mu$mol/g) and a base amount bP of 0 ($\mu$mol/g) which were derived from a pigment per 1 g of solid component, 55.4 parts of the polymer having a hydroxyl group and an epoxy group (b)-1 obtained in Preparation Example 4 and 35.6 parts of 1/1 mixed solvent of the aromatic hydrocarbon solvent "S100" manufactured by Esso K.K. and propylene glycol monomethyl ether acetate were charged in a 200 ml vessel and dispersed at 3000 rpm for 10 hours using a portable sandmill (manufactured by Taihei System K.K.) at 25° C. to obtain a pigment-dispersed paste, and this paste was evaluated according to the same manner as in Example C1. The results are shown in Table 7.

(2) Preparation and evaluation of colored coating composition

The same procedure as that of Example C1 was repeated to prepare a colored coating composition and a colored coated film, and they were evaluated. The results were shown in Table 8. The resulted colored coating composition had an acid total amount AR of 0 ($\mu$mol) and base total amount BR of 0 ($\mu$mol) which were derived from the pigment dispersing agent, and an acid total amount AP of 7650 ($\mu$mol) and base total amount BP of 0 ($\mu$mol) which were derived from the pigment.

Comparative Example C2

(1) Preparation and evaluation of pigment-dispersed paste 9.0 parts of the carbon black "FW 200P" manufactured by Degussa Corp. having an acid amount aP of 850 ($\mu$mol/g) and a base amount bP of 0 ($\mu$mol/g) which were derived from a pigment per 1 g of solid component, 7.0 parts of the pigment-dispersing agent "BYK 182" manufactured by Big Chemie Corp. having an acid amount aR of 0 ($\mu$mol/g) and a base amount bR of 550 ($\mu$mol/g) which were derived from a pigment-dispersing agent per 1 g of solid component and 48.5 parts of the polymer having a hydroxyl group and an epoxy group (b)-1 obtained in Preparation Example 4 were charged in a 200 ml vessel and dispersed at 3000 rpm for 10 hours using a portable sandmill (manufactured by Taihei System K.K.) at 25° C. to obtain a pigment-dispersed paste, and this paste was evaluated according to the same manner as in Example C1. The results are shown in Table 7.

(2) Preparation and evaluation of colored coating composition

The same procedure as that of Example C1 was repeated to prepare a colored coating composition and a colored coated film, and they were evaluated. The results were shown in Table 8. The resulted colored coating composition had an acid total amount AR of 0 ($\mu$mol) and base total amount BR of 1650 ($\mu$mol) which were derived from the pigment-dispersing agent, and an acid total amount AP of 7650 ($\mu$mol) and base total amount BP of 0 ($\mu$mol) which were derived from the pigment.

Comparative Example C3

(1) Preparation and evaluation of pigment-dispersed paste 9.0 parts of the carbon black "# 2500B" manufactured by Mitsubishi Kasei Co., Ltd. having an acid amount aP of 270 ($\mu$mol/g) and a base amount bP of 30 ($\mu$mol/g) which were derived from a pigment per 1 g of solid component, 15.0 parts of the pigment-dispersing agent "BYK 166" manufactured by Big Chemie Corp. having an acid amount aR of 0 ($\mu$mol/g) and a base amount bR of 1190 ($\mu$mol/g) which were derived from a pigment-dispersing agent per 1 g of solid component and 48.5 parts of the polymer having a hydroxyl group and an epoxy group (b)-1 obtained in Preparation Example 4 were charged in a 200 ml vessel and dispersed at 3000 rpm for 10 hours using a portable sandmill (manufactured by Taihei System K.K.) at 25° C. to obtain a pigment-dispersed paste, and this paste was evaluated according to the same manner as in Example C1. The results are shown in Table 7.

(2) Preparation and evaluation of colored coating composition

The same procedure as that of Example C1 was repeated to prepare a colored coating composition and a colored coated film, and they were evaluated. The results were shown in Table 8. The resulted colored coating composition had an acid total amount AR of 0 ($\mu$mol) and base total amount BR of 5355 ($\mu$mol) which were derived from the pigment-dispersing agent, and an acid total amount AP of 2430 ($\mu$mol) and base total amount BP of 0 ($\mu$mol) which were derived from the pigment.

TABLE 7

| | Evaluation of dispersed paste | | Evaluation of coating composition | |
|---|---|---|---|---|
| | Gloss of paste (60°/20°) | Yield value (dyne/cm$^2$) | Gloss of curtain coating (60°/20°) | Storage stability (change rate (%)) |
| Example C1 | 107/105 | 0.0 | 95.86 | 17 |
| Example C2 | 105/103 | 1.7 | 94/87 | 26 |
| Example C3 | 119/109 | 0.0 | 96/92 | 15 |
| Example C4 | 121/110 | 0.0 | 95/93 | 3 |
| Example C5 | 115/107 | 0.7 | 97/93 | 10 |
| Example C6 | 119/109 | 0.0 | 96/92 | 16 |
| Comparative Example C1 | 77/46 | 370 | 31/6 | 280 |
| Comparative Example C2 | 85/53 | 83.6 | 46/25 | 170 |
| Comparative Example C3 | 123/117 | 0.0 | 98/94 | 474 |

Examples C1 to C3 of the present invention show high gloss of a paste and low yield value as compared with Comparative Example C1 containing no pigment-dispersing agent. Further, also high gloss of curtain coating which is a practical property is obtained in Examples C1 to C3.

On the other hand, Comparative Examples C1 to C3 do not satisfy the condition of AR>0.5 BP or BR>0.5 AP, and dispersion degree, yield value, gloss of curtain coating of the paste are insufficient. Further, Comparative Example C3 does not satisfy the condition of BR<AR+AP, and viscosity of the coating increases steeply during storage.

TABLE 8

| | Acid resistance | Scratch resistance | SVS | Visual appearance |
|---|---|---|---|---|
| Example C1 | ⊚ | ○ | 44 | ○ |
| Example C2 | ⊚ | ○ | 44 | ○ |
| Example C3 | ⊚ | ○ | 44 | ○ |
| Example C4 | ⊚ | ○ | 45 | ○ |
| Example C5 | ⊚ | ○ | 44 | ○ |
| Example C6 | ⊚ | ○ | 49 | ○ |
| Comparative Example C1 | ⊚ | Δ | 41 | X |
| Comparative Example C2 | ⊚ | Δ | 35 | X |
| Comparative Example C3 | ⊚ | Δ | 35 | Δ |

Comparative Examples show low value of 20° gloss in curtain coating, and are poor in evaluation of visual appearance (hazy looking).

Example D

Evaluation of weather resistance of coated film

The coated plates obtained in Example A1, Comparative Example A3, Example C1 and Comparative Example C2 were subjected to treating cycle in which irradiation by Eye Super UV Tester (manufactured by Iwasaki Electric Co., Ltd.) was conducted for 24 hours under conditions of a temperature of 50° C. and a humidity of 100%, for five times. Then, gloss (60°) was measured and compared with the initial gloss. The results are shown in Table 9.

TABLE 9

| Sample | Initial gloss | Gloss after test |
| --- | --- | --- |
| Example A1 | 95 | 89 |
| Comparative Example A3 | 95 | 57 |
| Example C1 | 95 | 94 |
| Comparative Example C2 | 94 | 50 |

Effect of the Invention

Solid color coating compositions which suffice scratch resistance, acid resistance, storage stability and excellent appearance, are provided.

We claim:

1. A colored coating composition comprising
   (a) 5 to 60% by weight of a polymer having a carboxyl group and a carboxylate group, which is obtained by reacting:
      (i) an acid anhydride group-containing polymer, obtained by copolymerizing
         (1) 15 to 40% by weight of an acid anhydride group-containing ethylenically unsaturated monomer, with
         (2) 60 to 85% by weight of the other copolymerizable ethylenically unsaturated monomer; with
      (ii) a hydroxyl group-containing compound having 1 to 12 carbon atoms;
   in an amount so that a molar ratio of the acid anhydride group to the hydroxyl group becomes 1/10 to 1/1;
   (b) 5 to 60% by weight of a polymer having a hydroxyl group and an epoxy group, which is obtained by copolymerizing:
      (i) 5 to 70% by weight of a hydroxyl group-containing ethylenically unsaturated monomer represented by the formula:

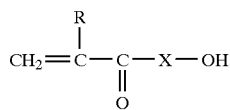

(I)

(wherein R is a hydrogen atom or a methyl group, and X is an organic chain represented by the formula:

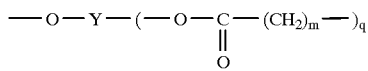

(wherein Y is a linear or branched alkylene group having 2 to 8 carbon atoms, m is an integer of 3 to 7 and q is an integer of 0 to 4) or an organic chain represented by the formula:

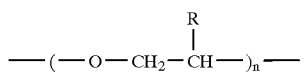

(wherein R is a hydrogen atom or a methyl group and n is an integer of 2 to 50)) and
      (ii) 10 to 60% by weight of an epoxy group-containing ethylenically unsaturated monomer, and optionally
      (iii) 0 to 85% by weight of the other copolymerizable ethylenically unsaturated monomer;

(c) 0.05 to 20% by weight of a pigment-dispersing agent; and
(d) 0.1 to 50% by weight of a pigment;
(wherein, each amount formulated of the components (a) to (d) is based on the weight of total solid in the colored coating composition),
wherein, an acid total amount AR and a base total amount BR which are derived from said pigment-dispersing agent, and an acid total amount AP and a base total amount BP which are derived from said pigment, suffice the following relations:

AR>0.5 BP or BR>0.5 AP, and

AR+AP>BR.

2. The colored coating composition according to claim 1, wherein said polymer (a) having a carboxyl group and a carboxylate group has a number average molecular weight of 1500 to 8000 and an acid value of 5 to 300 mgKOH/g based on solid.

3. The colored coating composition according to claim 1, wherein said acid anhydride group-containing ethylenically unsaturated monomer (a)(i)(1) is selected from the group consisting of itaconic anhydride, maleic anhydride, citraconic anhydride and a mixture thereof.

4. The colored coating composition according to claim 1, wherein said hydroxyl group-containing compound (a)(ii) is monoalcohol.

5. The colored coating composition according to claim 4, wherein said monoalcohol is selected from the group consisting of acetol, allyl alcohol, propargyl alcohol, furfuryl alcohol and methanol.

6. The colored coating composition according to claim 1, wherein said polymer (b) having a hydroxyl group and an epoxy group carries 2 to 10 epoxy groups in the molecule, and has an epoxy equivalent of 100 to 800, a hydroxyl equivalent of 200 to 1200 and a number average molecular weight of 500 to 8000.

7. The colored coating composition according to claim 1, wherein said pigment-dispersing agent is a polyurethane-based, polyurea-based, polyester-based or acryl-based resin.

8. The colored coating composition according to claim 1, wherein said pigment is an inorganic pigment.

9. The colored coating composition according to claim 8, wherein said pigment is selected from the group consisting of titanium oxide, iron oxide and carbon black.

10. The colored coating composition according to claim 1 further comprising a polyester having an acid value of 5 to 300 mgKOH/g (solid), a hydroxyl value of 5 to 300 mgKOH/g (solid) and a number average molecular weight of 400 to 6000 in an amount of up to 60% by weight based on the weight of total solid in the colored coating composition.

11. The colored coating composition according to claim 1 further comprising an aminoplast in an amount of up to 40% by weight based on the weight of total solid in the colored coating composition.

12. The colored coating composition according to claim 11, wherein said aminoplast is a melamine modified compound.

13. The colored coating composition according to claim 1 further comprising a silicone polymer having an epoxy group and an alkoxy group and having an epoxy equivalent of 100 to 1500 and an alkoxy equivalent of 50 to 1500, which is represented by the formula:

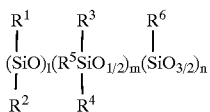 (II)

(wherein R¹ to R⁶ independently represents a substituent selected from the group consisting of an alkyl group having 1 to 10 carbon atoms, a phenyl group having 1 to 10 carbon atoms, a phenethyl group having 1 to 10 carbon atoms, an alkoxy group having 1 to 5 carbon atoms and the group represented by the formulae:

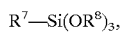

and

(wherein $R^7$ represents a linear or branched alkylene group, or a linear or branched alkylene group having an ether or ester linkage, $R^8$ represents an alkyl group having 1 to 5 carbon atoms, and Y represents an aliphatic or alicyclic group having an epoxy group), provided that at least one of $R^1$ to $R^6$ is an alkoxy group and another at least one is epoxy group; l represents an integer of 1 to 20; m represents an integer of 0 to 4; and n represents an integer of 0 to 2), in an amount of up to 30% by weight based on the weight of total solid in the colored coating composition.

14. The colored coating composition according to claim 1 further comprising a quaternary ammonium salt catalyst in an amount of 0.1 to 3% by weight based on the weight of total solid in the colored coating composition.

15. The colored coating composition according to claim 1 further comprising an organic tin compound in an amount of 0.2 to 6% by weight based on the weight of total solid in the colored coating composition.

16. The colored coating composition according to claim 1 further comprising crosslinked resin particles.

17. A method for forming a coated film, which comprises the steps of:
(A) applying on an undercoated and/or intercoated substrate an colored coating composition comprising
   (a) 5 to 60% by weight of a polymer having a carboxyl group and a carboxylate group, which is obtained by reacting:
      (i) an acid anhydride group-containing polymer, obtained by copolymerizing
         (1) 15 to 40% by weight of an acid anhydride group-containing ethylenically unsaturated monomer, with
         (2) 60 to 85% by weight of the other copolymerizable ethylenically unsaturated monomer; with
      (ii) a hydroxyl group-containing compound having 1 to 12 carbon atoms;
   in an amount so that a molar ratio of the acid anhydride group to the hydroxyl group becomes 1/10 to 1/1;

(b) 5 to 60% by weight of a polymer having a hydroxyl group and an epoxy group, which is obtained by copolymerizing:
   (i) 5 to 70% by weight of a hydroxyl group-containing ethylenically unsaturated monomer represented by the formula:

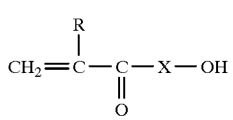 (I)

(wherein R is a hydrogen atom or a methyl group, and X is an organic chain represented by the formula:

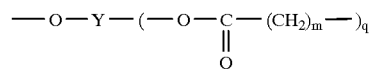

(wherein Y is a linear or branched alkylene group having 2 to 8 carbon atoms, m is an integer of 3 to 7 and q is an integer of 0 to 4) or an organic chain represented by the formula:

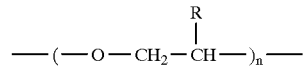

(wherein R is a hydrogen atom or a methyl group and n is an integer of 2 to 50)) and
   (ii) 10 to 60% by weight of an epoxy group-containing ethylenically unsaturated monomer, and optionally
   (iii) 0 to 85% by weight of the other copolymerizable ethylenically unsaturated monomer;
(c) 0.05 to 20% by weight of a pigment-dispersing agent; and
(d) 0.1 to 50% by weight of a pigment;
(wherein, each amount formulated of the components (a) to (d) is based on the weight of total solid in the colored coating composition),
wherein, an acid total amount AR and a base total amount BR which are derived from said pigment-dispersing agent, and an acid total amount AP and a base total amount BP which are derived from said pigment, suffice the following relations:

AR>0.5 BP or BR>0.5 AP, and

AR+AP>BR;

and
(B) curing the resulting coating by heating.
18. A coated product obtained by the method of claim 17.

* * * * *